United States Patent Office 3,663,559
Patented May 16, 1972

3,663,559
PREPARATION OF OXO-FURO-PYRIDINES FROM FURYLVINYL ISOCYANATES
Antoon M. Derijckere, Uccle, and Fernand G. F. Eloy, Rhode-Saint-Genese, Belgium, assignors to Union Carbide Corporation, New York, N.Y.
No Drawing. Continuation-in-part of application Ser. No. 788,318, Dec. 31, 1968, which is a continuation-in-part of application Ser. No. 742,531, July 5, 1968. This application Dec. 3, 1969, Ser. No. 881,872
Int. Cl. C07d 31/32
U.S. Cl. 260—297 B
10 Claims

ABSTRACT OF THE DISCLOSURE

Condensed pyridones are prepared by heating, for example, 2-(furyl)-, 2-(thienyl)-, or 2-(pyrrolyl)vinyl isocyanates. For instance, 4,5-dihydro-4-oxo-furo[3,2-c]pyridines are produced by heating 2-(2-furyl)vinyl isocyanates, 1,2-dihydro-1-oxo-benzothieno[2,3-c]pyridines are prepared by heating 2-(3-benzothienyl)vinyl isocyanates, and 4,5-dihydro-4-oxo pyrrolo[3,2-c]pyridines are prepared by heating 2-(pyrrolyl)vinyl isocyanates. The condensed pyridones are transformed into various derivatives by utilizing known types of reactions. The pyridones and their derivatives are useful reaction intermediates.

This application is a continuation-in-part of application Ser. No. 788,318, filed Dec. 31, 1968 and entitled "Condensed Pyridones, Process for Making Them, and Derivatives Thereof" now abandoned. Ser. No. 788,318 is a continuation-in-part of application Ser. No. 742,531, filed July 5, 1968, entitled "Production of Isocarbostyrils."

The invention relates to condensed pyridones, to a process for making them, and to certain derivatives thereof. In one aspect, the invention relates to furo-pyridones and to a process for making them which comprises heating a 2-(furyl)vinyl isocyanate. In another aspect, the invention relates to thienopyridones and to a process for making them which comprises heating a 2-(thienyl)vinyl isocyanate. In a further aspect, this invention relates to pyrrolyl-pyridones which comprises heating a 2-(pyrrolyl) vinyl isocyanate. The invention also relates to certain derivatives of said pyridones such as fused ring tetrazolo- and tetrazolo- derivatives of the pyridines corresponding to said pyridones.

The process of the invention can be represented in simplification by the following schematic reaction:

(a) 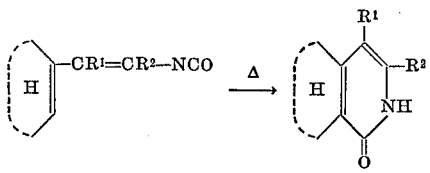

wherein $R^1$ and $R^2$ variables will be more fully defined below, and wherein the

moiety represents a hydrocarbon or an oxygen, sulfur, nitrogen, or selenium-containing heterocyclic group.

The process of the invention is further illustrated by the following specific reactions:

(b) The reaction of a 2-(2-furyl)vinyl isocyanate to form a 4,5-dihydro-4-oxo-furo[3,2-c]pyridine:

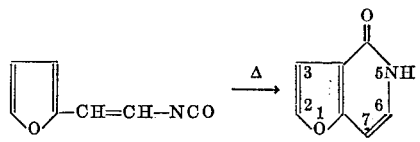

(c) The reaction of a 2-(3-furyl)vinyl isocyanate to form a 6,7-dihydro-7-oxo-furo[2,3-c]pyridino:

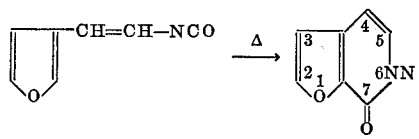

(d) The reaction of a 2-(2-thienyl)vinyl isocyanate to form a 4,5-dihydro-4-oxo-thieno[3,2-c]pyridine:

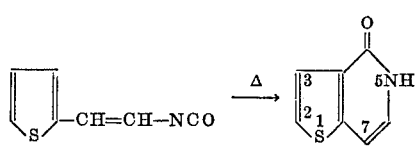

(e) The reaction of a 2-(3-thienyl)vinyl isocyanate to form a 6,7-dihydro-7-oxo-thieno[2,3-c]pyridine:

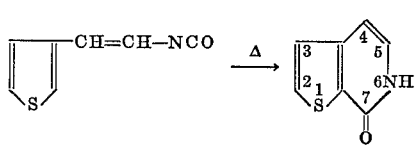

(f) The reaction of a 2-(2-pyrrolyl) vinyl isocyanate to form a 4,5-dihydro-4-oxo-pyrrolo[3,2-c]pyridine:

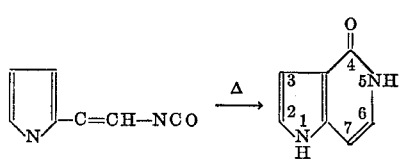

(g) The reaction of a 2-(2-benzofuryl)vinyl isocyanate to form a 1,2-dihydro-1-oxo-benzofuro[3,2-o]pyridine:

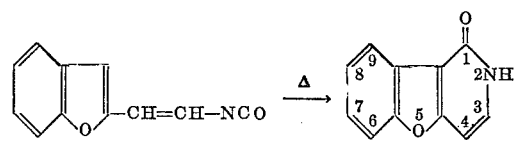

(h) The reaction of a 2-(3-benzofuryl)vinyl isocyanate to form a 1,2-dihydro-1-oxo-benzofuro[2,3c]pyridine:

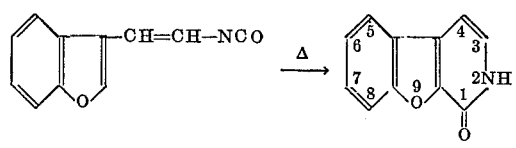

(i) The reaction of a 2-(2-benzothienyl)vinyl isocyanate to form a 1,2-dihydro-1-oxo-benzothieno[2,3-c]pyridine:

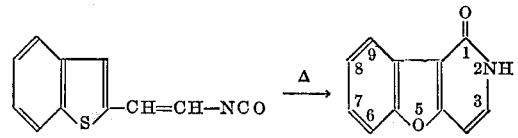

(j) The reaction of a 2-(3-benzothienyl)vinyl isocyanate to form a 1,2-dihydro-1-oxo-benzothieno[2,3-c]pyridine.

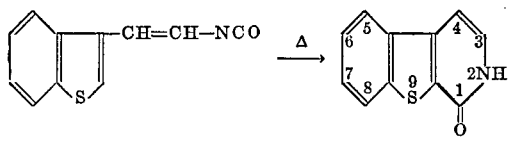

(k) The reaction of a 2-(2-benzopyrrolyl(vinyl isocyanate to form a 1,2-dihydro-1-oxo-benzopyrrolol[3,2-c] pyridine:

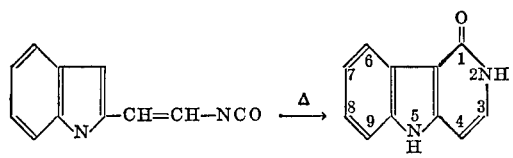

The starting reactant in the process of the invention is a 2-(furyl)vinyl isocyanate, a 2-(thienyl)vinyl isocyanate, or a 2-(pyrrolyl)vinyl isocyanate. These vinyl isocyanate starting reactants constitute a novel class of compositions which can be derived from known aldehydes or ketones by the following routes, which utilize well-known reactions:

The Knoevenagel-Doebner condensation of aldehydes with malonic acid to form an alpha, beta-unsaturated acid:

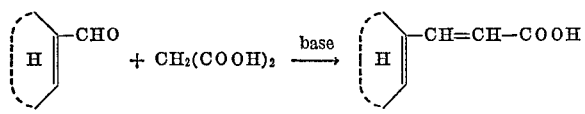

In this and in subsequent reactions, the

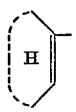

moiety is as defined above.

The Knoevenagel-Doebner condensation is discussed in the following references.

J. R. Johnson, "Organic Reactions" I, pp. 226, 233 (New York, 1942);
Fieser and Fieser, "Organic Chemistry," 3rd Edition, p. 692 (New York, 1956);
H. O. House, "Modern Synthetic Reactions," p. 225 (New York, 1965).

(m) Reaction of the alpha, beta-unsaturated acid product of Reaction 1 with thionyl chloride to form the corresponding acid chloride:

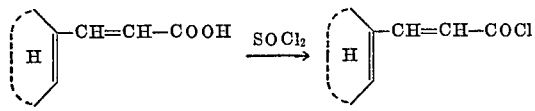

This reaction is well known. It is discussed, for instance, by Fieser and Fieser (2nd Edition) on page 183.

(n) The reaction of the acid chloride with sodium azide to produce the corresponding acid azide (Ref., Fieser and Fieser, 2nd Edition, p. 229):

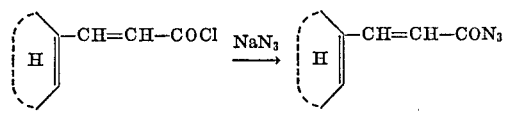

If desired, the azide can be produced in one step from the acid by using the method of G. Weinstock, J. Org. Chem. 26, 3511 (1961).

(o) The Curtius rearrangement of the acid azide to the vinyl isocyanate (Ref., Fieser and Fieser, 2nd Edition, p. 229):

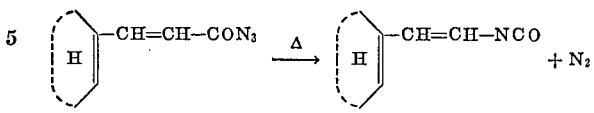

In the foregoing sequence of reactions (1) through (o), the preparation of vinyl isocyanates of the formula:

I

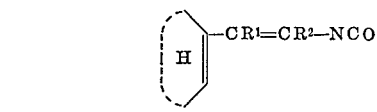

wherein $R^1$ and $R^2$ are both hydrogen has been described. However, $R^1$ can also be alkyl, haloalkyl, benzyl, or dimethylaminomethyl, and $R^2$ can also be alkyl or cyano. Such compounds can be prepared by the following routes:

(p) The Reformatsky Reaction of an aldehyde or ketone with an alpha-halo ester (usually an alpha-bromo ester) in the presence of zinc to form a beta-hydroxy ester which is readily dehydrated and then hydrolyzed to the desired unsaturated acid. The acid is then used as described above in Reaction (m):

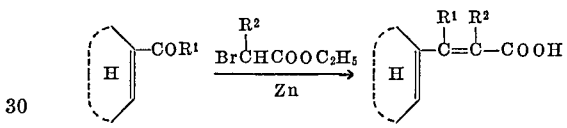

In the Reformatsky Reaction, $R^1$ can be hydrogen or alkyl, and $R^2$ can be hydrogen or alkyl. The Reformatsky Reaction is reviewed by R. L. Shriner in Chapter 1 of "Organic Reactions," volume I, edited by Roger Adams et al. (John Wiley & Sons, New York, 1942).

(q) The Perkin Reaction of an aldehyde of the aromatic type (including 2-furaldehydes and 2-thenaldehydes) with an acid anhydride in the presence of the sodium salt of the acid to form an alpha,beta-unsaturated acid. The unsaturated acid is then used as described above in Reaction (m):

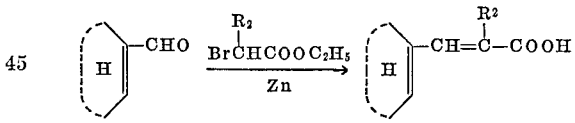

In the Perkin Reaction, the $R^2$ variable can be hydrogen, alkyl, or cyano. The Perkins Reaction is reviewed by J. R. Johnson in Chapter 8 of "Organic Reactions," volume I.

Other known procedures for producing alpha,beta-unsaturated acids, such as the Claisen condensation of an aldehyde with an ester in basic medium, can be used to produce the acids that are the starting reactants in Reaction (m), above.

Among the aldehydes and ketones that can be used as starting reactants in Reactions (1), (p), (q), or other reaction for producing the desired alpha,beta-unsaturated acids from which the vinyl isocyanates used in the process of the invention can be derived, are the following compounds:

2-furaldehyde,
5-benzyl-2-furaldehyde,
5-bromo-2-furaldehyde,
5-chloro-2-furaldehyde,
5-chloromethyl-2-furaldehyde,
5-diethylaminomethyl-2-furaldehyde,
4,5-dimethyl-2-furaldehyde,
5-ethoxymethyl-2-furaldehyde,
5-ethyl-2-furaldehyde,
5-ethylthio-2-furaldehyde,
5-iodo-2-furaldehyde,
5-benzylthio-2-furaldehyde,
5-isobutylthio-2-furaldehyde, 5-methoxymethyl-2-furaldehyde,
5-methyl-2-furaldehyde,
5-methylthio-2-furaldehyde,
4-methyl-5-p-tolyl-2-furaldehyde,
5-phenoxymethyl-2-furaldehyde,
5-phenylthio-2-furaldehyde,
5-octyloxymethyl-2-furaldehyde,
5-tricyanovinyl-2-furaldehyde,
5-(p-methoxybenzyl)-2-furaldehyde,
5-(p-methylbenzyl)-2-furaldehyde,
5,5'-dithiodi-(2-furaldehyde),
5,5'-thiodi-(2-furaldehyde),
5-benzylsulfonyl-2-furaldehyde,
4,5-dibromo-2-furaldehyde,
5-(p-methoxyphenyl)-2-furaldehyde,
5-methylsulfonyl-2-furaldehyde,
5-phenylsulfonyl-2-furaldehyde,
4,5-diphenyl-2-furaldehyde,
5,5'-(oxydimethylene)di-(2-furaldehyde),
5-(benzylthiomethyl)-2-furaldehyde,
5-butoxymethyl-2-furaldehyde,
5-butylthiomethyl-2-furaldehyde,
5-dimethylamino-2-furaldehyde,
5-ethylthiomethyl-2-furaldehyde,
5-(isopentyloxymethyl)-2-furaldehyde,
5-isopropylthiomethyl-2-furaldehyde,
5-morpholino-2-furaldehyde,
5-(phenylthiomethyl)-2-furaldehyde,
5-propoxymethyl-2-furaldehyde,
5-(2-propynyl)-2-furaldehyde,
5-styryl-2-furaldehyde,
4-bromo-5-butylthio-2-furaldehyde,
4-bromo-5-ethylthio-2-furaldehyde,
4-bromo-5-methylthio-2-furaldehyde,
5,5'-ethylenedi-(2-furaldehyde),
5,5'-methylenedi-(2-furaldehyde),
5,5'-(oxydimethylene)di-(2-furaldehyde),
5-(2-benzoylvinyl)-2-furaldehyde,
5-[2-(2-furoyl)vinyl]-2-furaldehyde,
5-hexyl-2-furaldehyde,
5-(3-hexynyl)-2-furaldehyde,
5-[2-(2-methoxyethoxy)ethoxy]methyl-2-furaldehyde,
5-(2-methoxyethoxy)methyl-2-furaldehyde,
5-[2-(2-phenoxy)vinyl]-2-furaldehyde,
5-(4,4,6-trimethyl-m-dioxan-2-yl)-2-furaldehyde,
5-benzoyl-2-furaldehyde,
5-cyclohexyl-2-furaldehyde,
5-(diethoxymethyl)-2-furaldehyde,
5-(diethylphenylsilyl)-2-furaldehyde,
5-(dimethylphenylsilyl)-2-furaldehyde,
5-(ethyldimethylsilyl)-2-furaldehyde,
5-phenyl-2-furaldehyde,
5-(phenylbutadiynyl)-2-furaldehyde,
5-(phenylethynyl)-2-furaldehyde,
5-triethylsilyl-2-furaldehyde,
5-trimethylsilyl-2-furaldehyde,
5-(trimethylsilyl)methyl-2-furaldehyde, and other 2-furaldehydes.

Other aldehydes that can be used include:

3-furaldehyde,
2,5-diphenyl-3-furaldehyde,
2-(butylthio)-5-methyl-3-furaldehyde,
2-(ethylthio)-5-methyl-3-furaldehyde,
2-(ethylthio)-5-propyl-3-furaldehyde,
2-methyl-3-furaldehyde,
5-ethyl-3-furaldehyde, and other 3-furaldehydes.

There also can be used 2-benzofurancarboxaldehyde and 3-benzofurancarboxaldehyde. While no substituted benzofurancaboxaldehydes have been reported in the literature, they can readily be derived by formylation of substituted benzofuranes.

The following furyl ketones can be used in accordance with the discussion above:

5-benzyl-2-furyl methyl ketone,
5-bromo-2-furyl methyl ketone,
5-tert-butyl-2-furyl methyl ketone,
5-chloro-2-furyl methyl ketone,
2,5-dimethyl-3-furyl methyl ketone,
5-ethyl-2-furyl methyl ketone,
2-furyl methyl ketone,
3-furyl methyl ketone,
2-methyl-3-furyl methyl ketone,
5-(methylthio)-2-furyl methyl ketone,
5-propyl-2-furyl methyl ketone,
2-benzofuranyl ethyl ketone,
2-benzofuranyl methyl ketone,
5-benzyl-2-benzofuranyl methyl ketone,
4-(benzyloxy)-2-benzofuranyl methyl ketone,
5-ethyl-2-benzofuranyl methyl ketone,
7-ethyl-2-benzofuranyl methyl ketone, and other furyl ketones.

Among the thiophenecarboxaldehydes that can be used are the following compounds:

4-bromo-2-thiophenecarboxaldehyde,
2-thiophenecarboxaldehyde,
5-bromo-2-thiophenecarboxaldehyde,
5-butoxy-2-thiophenecarboxaldehyde,
4-tert.-butyl-2-thiophenecarboxaldehyde,
5-butyl-2-thiophenecarboxaldehyde,
5-(butylthio)-2-thiophenecarboxaldehyde,
5-(tert.-butylthio)methyl-2-thiophenecarboxaldehyde,
5-chloro-2-thiophenecarboxaldehyde,
5-cyano-2-thiophenecarboxaldehyde,
5-(1,1-diethoxy)-2-thiophenecarboxaldehyde,
5-(dodecylthio)-2-thiophenecarboxaldehyde,
5-ethoxy-2-thiophenecarboxaldehyde,
5-ethyl-4-methyl-2-thiophenecarboxaldehyde,
5-(alpha-ethyl-alpha-methyl-2-thenyl)-2-thiophencarboxaldehyde,
5-ethylthio-2-thiophenecarboxaldehyde,
5-(ethylthiomethyl)-2-thiophenecarboxaldehyde,
5-(heptylthio)-2-thiophenecarboxaldehyde,
5-(hexylthio)-2-thiophenecarboxaldehyde,
5-isobutylthio-2-thiophenecarboxaldehyde,
5-(isobutylthiomethyl)-2-thiophenecarboxaldehyde,
5-(isopentylthio)-2-thiophenecarboxaldehyde,
5-isopropylthio-2-thiophenecarboxaldehyde,
5-methoxy-2-thiophenecarboxaldehyde,
5-(p-methoxyphenylsulfonyl)-2-thiophenecarboxaldehyde,
5-(p-methoxyphenylthio)-2-thiophenecarboxaldehyde,
5-methyl-2-thiophenecarboxaldehyde,
5-(5-methyl-2-thenyl)-2-thiophenecarboxaldehyde,
5-methylthio-2-thiophenecarboxaldehyde,
5-(octadecylthio)-2-thiophenecarboxaldehyde,
5-(pentyloxy)-2-thiophenecarboxaldehyde,
5-(pentylthio)-2-thiophenecarboxaldehyde,
5-(3-phenylpropyl)-2-thiophenecarboxaldehyde,
5-propenyl-2-thiophenecarboxaldehyde,
5-propoxy-2-thiophenecarboxaldehyde,
5-propylthio-2-thiophenecarboxaldehyde,
5-(1-propynyl)-2-thiophenecarboxaldehyde,
5-(2-thenyl)-2-thiophenecarboxaldehyde,
4-methyl-2-thiophenecarboxaldehyde,
4,5-dichloro-2-thiophenecarboxaldehyde,
5,5'-hexamethylenedi-(2-thiophenecarboxaldehyde),
5-methoxymethyl-2-thiophenecarboaldehyde,
5-(butylthiomethyl)-2-thiophenecarboxaldehyde,
5-(phenylethynyl)-2-thiophenecarboxaldehyde,
5-(2-thienylethynyl)-2-thiophenecarboxaldehyde,
5-vinyl-2-thiophenecarboxaldehyde,
5,5'-(ethylenedithio)di-(2-thiophenecarboxaldehyde),
5-(2-thienylthio)-2-thiophenecarboxaldehyde,
5,5'-thiodi-(2-thiophenecarboxaldehyde), 5-(trimethylsilyl)-2-thiophenecarboxaldehyde,
5-(diethoxymethyl)-2-thiophenecarboxaldehyde,
4-chloromethyl-2-thiophenecarboxaldehyde,
5-chloromethyl-2-thiophenecarboxaldehyde,
4-chloromethyl-5-methyl-2-thiophenecarboxaldehyde,
4,5-dibromo-2-thiophenecarboxaldehyde,
5-ethyl-2-thiophenecarboxaldehyde,
5-(tert.-butylthio)-2-thiophenecarboxaldehyde,
5-(beta-cyanostyryl)-2-thiophenecarboxaldehyde,
5-cyclopentadienyl-2-thiophenecarboxaldehyde,
5,5'-isopropylidenedi-(2-thiophenecarboxaldehyde),
5,5'-(2-butylidene)di-(2-thiophenecarboxaldehyde),
4-methoxymethyl-2-thiophenecarboxaldehyde,
5-styryl-2-thiophenecarboxaldehyde,
4,5-dimethyl-2-thiophenecarboxaldehyde,
5-(2,2-dimethylbutyl)-2-thiophenecarboxaldehyde,
5-(2,2-dimethylpentyl)-2-thiopenecarboxaldehyde,
5-(2-ethylbutyl)-2-thiophenecarboxaldehyde,
5-iodo-2-thiophenecarboxaldehyde,
4,5-bis(chloromethyl)-2-thiophenecarboxaldehyde,
5,5'-ethylenedi-(2-thiophenecarboxaldehyde),
5-(piperidinomethyl)-2-thiophenecarboxaldehyde,
5-[2-(2-thienyl)ethyl]-2-thiophenecarboxaldehyde,
5-[2-(2-thienyl)vinyl]-2-thiophenecarboxaldehyde,
5-(1-adamantyl)-2-thiophenecarboxaldehyde,
5-(ethyldimethylsilyl)-2-thiophenecarboxaldehyde,
5-(methyldiphenylsilyl)-2-thiophenecarboxaldehyde,
5-(triethylsilyl)-2-thiophenecarboxaldehyde,
5-(trimethylsilyl)-2-thiophenecarboxaldehyde,
5-(triphenylsilyl)-2-thiophenecarboxaldehyde, and other 2-thiophenecarboxaldehydes.

Other aldehydes that can be used include the following: compounds:

3-thiophenecarboxaldehyde,
2-bromo-3-thiophenecarboxaldehyde,
4-bromo-3-thiophenecarboxaldehyde,
2,5-di(tert.-butyl)-3-thiophenecarboxaldehyde,
5-(1,1-diethoxyethyl)-3-thiophenecarboxaldehyde,
2-methyl-3-thiophenecarboxaldehyde,
4-methyl-3-thiophenecarboxaldehyde,
5-methyl-2-methylthio-3-thiophenecarboxaldehyde,
2-(benzylthio)-5-ethyl-3-thiophenecarboxaldehyde,
2,2'-dithiobis-(5-ethyl-3-thiophenecarboxaldehyde),
5-ethyl-3-thiophenecarboxaldehyde,
5-ethyl-2-ethylthio-3-thiophenecarboxaldehyde,
2-methylthio-3-thiophenecarboxaldehyde,
4-methylthio-3-thiophenecarboxaldehyde,
5-methylthio-3-thiophenecarboxaldehyde,
2,5-dichloro-3-thiophenecarboxaldehyde,
5-(diethoxymethyl)-3-thiophenecarboxaldehyde,
5-methyl-3-thiophenecarboxaldehyde,
2-(tert.-butylsulfonyl)-5-methyl-3-thiophenecarboxaldehyde,
2,5-dibromo-3-thiophenecarboxaldehyde,
2-chloro-3-thiophenecarboxaldehyde, and other 3-thiophenecarboxaldehydes.

Still more aldehydes include the following compounds:

2-benzothiophenecarboxaldehyde,
5-bromo-2-benzothiophenecarboxaldehyde,
4-bromo-7-methyl-2-benzothiophenecarboxaldehyde,
6-bromo-7-methyl-2-benzothiophenecarboxaldehyde,
7-methyl-2-benzothiophenecarboxaldehyde,
5,6-dimethoxy-2-benzothiophenecarboxaldehyde,
6-ethoxy-2-benzothiophenecarboxaldehyde,
3-benzothiophenecarboxaldehyde,
7-methyl-3-benzothiophenecarboxaldehyde,
4-bromo-7-methyl-3-benzothiophenecarboxaldehyde,
6-bromo-7-methyl-3-benzothiophenecarboxaldehyde, and other benzothiophenecarboxaldehydes.

Among the thienyl ketones that can be used are the following compounds:

benzyl 2-thienyl ketone,
5-bromo-2-thienyl methyl ketone,
4-bromo-2-thienyl methyl ketone,
5-butyl-2-thienyl methyl ketone,
5-chloro-2-methyl-3-thienyl methyl ketone,
5-chloro-2-thienyl methyl ketone,
5-chloro-2-thienyl trichloromethyl ketone,
and other thienyl ketones.

Among the pyrrolyl aldehydes which can be employed are such compositions as:

pyrrolyl-2-carboxaldehyde,
1-benzyl-4-carbethoxy-5-methyl-pyrrole-2-carboxaldehyde,
N-benzylpyrrole-2-carboxaldehyde,
N-benzyl-indole-3-carboxaldehyde,
1,3-dimethylpyrrole-5-carboxaldehyde,
and the like.

The above-exemplified known aldehydes and ketones can be used in Reactions (1), (p) and (q), as discussed above. The other reactants which can be used in said Reactions (1), (p) and (q) include malonic acid for the Knoevenagel-Doebner condensation, and esters of 2-bromo-acetic acid, esters of 2-bromo-propionic acid, esters of 2-bromo-butyric acid, esters of 2-bromo-pentanoic acid, esters of 2-bromo-hexanoic acid, esters of 2-bromo-heptanoic acid, esters of 2-bromo-octanoic acid, esters of 2-bromo-decanoic acid, esters of 2-bromo-dodecanoic acid, and other esters of 2-bromo-alkanoic acids for Reaction (p). Usually, the ethyl esters are selected for the Reformatsky Reaction, although other esters can be used, if desired. In the Perkin Reaction, the acid anhydride can be acetic anhydride, propionic anhydride, 2-cyano-acetic anhydride, and other well known acid anhydrides.

The foregoing discussion has described the preparation of the 2-(furyl)vinyl isocyanates, the 2-(thienyl)vinyl isocyanates, and the 2-(pyrrolyl)vinyl isocyanates that are used as the starting reactants in the process of the invention. Said vinyl isocyanates are available from known classes of compounds using known synthetic techniques. Among the vinyl isocyanates that can be used in the process of the invention are the following compounds:

2-(2-furyl)vinyl isocyanate,
2-(5-bromo-2-furyl)vinyl isocyanate,
2-(5-chloro-2-furyl)vinyl isocyanate,
2-(5-chloromethyl-2-furyl)vinyl isocyanate,
2-(5-diethylaminomethyl-2-furyl)vinyl isocyanate,
2-(4,5-dimethyl-2-furyl)vinyl isocyanate,
2-(5-methyl-2-furyl)vinyl isocyanate,
2-(5-ethoxymethyl-2-furyl)vinyl isocyanate,
2-(5-ethyl-2-furyl)vinyl isocyanate,
2-(5-methylthio-2-furyl)vinyl isocyanate,
2-(5-methoxymethyl-2-furyl)vinyl isocyanate,
2-(4,5-dibromo-2-furyl)vinyl isocyanate,
2-(5-dimethylamino-2-furyl)vinyl isocyanate,
2-(5-morpholino-2-furyl)vinyl isocyanate,
2-(4-bromo-5-methylthio-2-furyl)vinyl isocyanate,
2-methyl-2-(2-furyl)vinyl isocyanate,
2-ethyl-2-(4,5-dimethyl-2-furyl)vinyl isocyanate,
1-cyano-2-(4-bromo-5-methylthio-2-furyl)vinyl isocyanate,
1-butyl-2-methyl-2-(4,5-dibromo-2-furyl)vinyl isocyanate,
2-(3-furyl)vinyl isocyanate,
2-(5-ethyl-3-furyl)vinyl isocyanate,
2-(2-methyl-3-furyl)vinyl isocyanate,
2-(2-ethylthio-5-methyl-3-furyl)vinyl isocyanate,
2-(2-benzofuryl)vinyl isocyanate,
2-(3-benzofuryl)vinyl isocyanate,
2-methyl-2-(2-benzofuryl)vinyl isocyanate,
2-methyl-2-(3-furyl)vinyl isocyanate,
and other 2-(furyl)vinyl isocyanates.

Additional vinyl isocyanates that can be used in the process of the invention include the following 2-(thienyl)-vinyl isocyanates:

2-(2-thienyl)vinyl isocyanate,
2-(3-thienyl)vinyl isocyanate,
2-(2-benzothienyl)vinyl isocyanate,
2-(3-benzothienyl)vinyl isocyanate,
2-(5-bromo-2-thienyl)vinyl isocyanate,
2-(5-chloro-2-thienyl)vinyl isocyanate,
2-(5-methyl-2-thienyl)vinyl isocyanate,
2-(5-methoxy-2-thienyl)vinyl isocyanate,
2-(5-methylthio-2-thienyl)vinyl isocyanate,
2-(4-methyl-2-thienyl)vinyl isocyanate,
2-(5-propenyl-2-thienyl)vinyl isocyanate,
2-(5-butoxy-2-thienyl)vinyl isocyanate,
2-(5-isobutylthiomethyl-2-thienyl)vinyl isocyanate,
2-(4,5-dichloro-2-thienyl)vinyl isocyanate,
2-(5-methoxymethyl-2-thienyl)vinyl isocyanate,
2-(4-chloromethyl-2-thienyl)vinyl isocyanate,
2-(5-chloromethyl-2-thienyl)vinyl isocyanate,
2-(4-chloromethyl-5-methyl-2-thienyl)vinyl isocyanate,
2-(4,5-dibromo-2-thienyl)vinyl isocyanate,
2-(4-5-dimethyl-2-thienyl)vinyl isocyanate,
2-[4,5-bis(chloromethyl)-2-thienyl]vinyl isocyanate,
2-(5-piperidinomethyl-2-thienyl)vinyl isocyanate,
1-cyano-2-(2-thienyl)vinyl isocyanate,
1-butyl-2-(2-thienyl)vinyl isocyanate,
2-(2-bromo-3-thienyl)isocyanate,
2-(4-bromo-3-thienyl)vinyl isocyanate,
2-(2-methyl-3-thienyl)vinyl isocyanate,
2-(4-methyl-3-thienyl)vinyl isocyanate,
2-(2-methylthio-3-thienyl)vinyl isocyanate,
2-(4-methylthio-3-thienyl)vinyl isocyanate,
2-(5-methylthio-3-thienyl)vinyl isocyanate,
2-(2,5-dichloro-3-thienyl)vinyl isocyanate,
2-(5-methyl-3-thienyl)vinyl isocyanate,
2-(5-bromo-2-benzothienyl)vinyl isocyanate,
2-(4-bromo-7-methyl-2-benzothienyl)vinyl isocyanate,
2-(6-bromo-7-methyl-2-benzothienyl)vinyl isocyanate,
2-(7-methyl-2-benzothienyl)vinyl isocyanate,
2-(5-6-dimethoxy-2-benzothienyl)vinyl isocyanate,
2-(6-ethoxy-2-benzothienyl)vinyl isocyanate,
2-(7-methyl-3-benzothienyl)vinyl isocyanate,
2-(4-bromo-7-methyl-3-benzothienyl)vinyl isocyanate,
2-(6-bromo-7-methyl-3-benzothienyl)vinyl isocyanate,
2-methyl-2-(2-thienyl)vinyl isocyanate,
2-methyl-2-(3-thienyl)vinyl isocyanate,
2-methyl-2-(3-benzothienyl)vinyl isocyanate,
2-methyl-2-(4-bromo-2-thienyl)vinyl isocyanate,
2-methyl-2-(5-bromo-2-thienyl)vinyl isocyanate,
2-methyl-2-(5-butyl-2-thienyl)vinyl isocyanate,
2-methyl-2-(5-chloro-2-thienyl)vinyl isocyanate,
2-(3-pyrrolyl)vinyl isocyanate,
2-(4-pyrrolyl)vinyl isocyanate,
2-(2-methyl-3-pyrrolyl)vinyl isocyanate,
2-(5-phenyl-3-pyrrolyl)vinyl isocyanate,
2-(4-chloro-3-pyrrolyl)vinyl isocyanate,
and other isocyanates.

The vinyl isocyanates that are used in the process of the invention constitute a class of compounds that can be represented by Formula I:

I 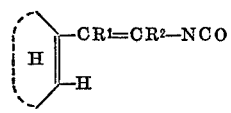—CR¹=CR²—NCO wherein R¹ represents hydrogen, alkyl (wherein the alkyl has up to 6 carbon atoms, and is preferably methyl or ethyl), trichloromethyl, benzyl or dimethylaminomethyl, wherein R² represents hydrogen, alkyl of up to 12 carbon atoms (and preferably of up to 6 carbon atoms), or cyano, and wherein the

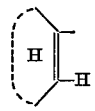

moiety represents a hydrocarbon or a 2-furyl group, a 3-furyl group, a 2-thienyl group, a 3-thienyl group, a 2-pyrrolyl group, a 3-pyrrolyl group, a 3-pyrazolyl group, 2-pyrazolyl group, or their benzo derivatives. Said groups can be substituted with halo, alkyl, alkoxy, alkylthio, cyano, aryl, benzyl, haloalkyl, aryloxy, dialkylaminoalkyl, alkoxyalkyl, benzylthio, arylthio, alkenyl, alkynyl, alkylsulfonyl, arylsulfonyl, benzylsulfonyl, benzylthiomethyl, alkylthioalkyl, dialkylamino, morpholino, arylthiomethyl, styryl, cycloalkyl, benzoyl, trihydrocarbylsilyl, benzyloxy, furyl, thenyl, dialkoxyalkyl, piperidinomethyl, aryloxyalkyl, benzoylvinyl, adamantyl, and the like groups which will usually have not more than 20 carbon atoms. In addition, two vinyl isocyanate moieties can be joined together by divalent connecting groups such as thio, dithio, oxydimethylene, alkylene, alkylenedithio, alkyldiene, and the like groups. Such divalent connecting groups will normally have not more than 10 carbon atoms, and preferably not more than 6 carbon atoms. Preferred R¹ groups include hydrogen and methyl, preferred R² groups include hydrogen and alkyl of up to 6 carbon atoms, and the preferred substituent groups on the furyl or thienyl groups include bromo, chloro, alkyl of up to 6 carbon atoms, alkoxy of up to 6 carbon atoms, alkylthio of up to 6 carbon atoms, chloromethyl, dialkylaminoalkyl wherein the alkyl groups have up to 4 carbon atoms, and the like.

The process of the invention comprises heating a vinyl isocyanate as described above at an elevated temperature for a period of time sufficient to produce a condensed pyridone. The exact temperature at which the vinyl isocyanate must be heated in order to produce the condensed pyridone is dependent, in part, upon the exact nature of the reactant. In general, however, the reaction occurs at a temperature within the range of from about 200° C. to about 300° C., and preferably from about 220° C. to about 280° C. It is convenient to carry out the reaction by refluxing the vinyl isocyanate in an inert, liquid reaction medium that boils within the temperature range indicated above. Such reaction mediums include diphenyl ether, the dibutyl diether of diethylene glycol, the acetate ester of the monobutyl ether of diethylene glycol, benzophenone, dimethyl phthalate, and the like. Diphenyl ether is the preferred reaction medium.

The exact reaction time varies to an extent, depending upon the exact nature of the vinyl isocyanate, reaction medium, and the temperature. In most cases, the reaction will be completed in from about one-half to about four hours, and preferably from about one to about three hours.

In a preferred aspect of the invention, the vinyl isocyanate can be produced in situ by the Curtius Rearrangement of the corresponding acid azide. This can be done by heating the azide at a relatively low temperature, for instance of from about 60° to 70° C., until evolution of nitrogen ceases, after which the reaction mixture is heated to a higher temperature to effect the ring closure reaction. However, a preferred way is to slowly introduce the acid azide into boiling reaction medium.

It is preferred to include a high-boiling tertiary amine in the reaction mixture. Such amines include tri-(tert.-butyl)amine, tripentylamine, trihexylamine, and the like. The tertiary amine can be used in varying amount, such as from about 5 mole percent to about 300 mole percent, and preferably from about 50 mole percent to about 150 mole percent, based on the moles of vinyl isocyanate used.

The vinyl isocyanates used in the process of the invention contain unsaturation which is capable of undergoing polymerization under certain conditions, as will be readily understood by chemists. Accordingly, it is desirable to carry out the process of the invention in the absence of free radical polymerization promotors, which includes oxygen. In many cases, the boiling reaction medium will provide a sufficiently inert atmosphere to avoid excessive loss of yield due to polymerization of the reactant and/or product. However, it may be desirable in some cases (such as when using a furyl compound having both the 4 and 5 positions unsubstituted, or when the vinyl isocyanate contains a reactive substituent group such as a vinyl group) to add a free radical polymerization inhibitor to the reaction medium. Such inhibitors can be used in customary amounts, which are well known in the art.

The condensed pyridone product can be recovered by conventional procedures. For instance, the reaction medium can be removed by distillation under vacuum, the pyridone can be dissolved in diethyl ether, and then recrystallized from a convenient solvent. The examples below illustrate the solvents that can be used for the recrystallization. When a high-boiling tertiary amine is used in the reaction, it is most conveniently removed by vacuum distillation along with the reaction medium.

The examples below illustrate the process of the invention, the condensed pyridones which can be made by the process of the invention, and certain derivatives thereof.

EXAMPLE 1

4,5-dihydro-4-oxo-thieno[3,2-c]pyridine-1(f)

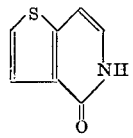

(a) 2-thenaldehyde.—Organic Syntheses, vol. IV, p. 915.

(b) β-(2-thiophene)acrylic acid.—R. Kimura, T. Yabuuchi and Y. Tamura. Chem. Pharm. Bull. 8, 169 (1960). Chem. Ab. 55, 5454 h.

(c) β-(2-thiophene)acrylyl chloride.—R. Kimura and colleagues.

(d) β-(2-thiophene)acrylyl azide.

(1) From 1(c): A suspension of 39.6 g. (0.6 mole) of $NaN_3$ in 70 cc. of $H_2O$ and 70 cc. of dioxane was cooled at 1°–5° C. To this suspension was introduced dropwise a solution of 51.75 g. (0.3 mole) of β-(2-thiophene)acrylyl chloride in 100 cc. of dioxane, the mixture being vigorously stirred and the temperature maintained below 5° C. After the addition is completed, stirring was continued for 2 hours. On pouring the reaction mixture on ice, the azide precipitated. The crude product was filtered and dissolved in methylene chloride or benzene. After being carefully dried on $Na_2SO_4$, the solution of azide was used in the next reaction step.

(2) From 1(b): 1 mole of triethylamine in 400 cc. of acetone was introduced in a solution of 131 g. (0.85 mole) of β-(2-thiophene)acrylic acid in 1500 cc. of the same solvent, the mixture being maintained at 0° C. A solution of 1.1 moles of ethyl chloroformate in 400 cc. of acetone was then slowly introduced in the cooled mixture. After 30 minutes stirring, 1.3 moles of $NaN_3$ in 300 cc. of water was added dropwise at 0°. The mixture was stirred for an additional hour and poured on 4000 ml. of $H_2O$. The azide was then extracted with methylene chloride or benzene and the solution was dried on $$Na_2SO_4$$

or $P_2O_5$. This solution was used for the following reaction.

(e) β-(2-thiophene)vinyl isocyanate.—Generally, the thienopyridone 1(f) is prepared directly from the crude solution of the corresponding azide 1(d) without isolating the isocyanate intermediate 1(e). However, the isocyanate has been isolated and characterized as follows:

A solution of 1(d) in methylene chloride or benzene was boiled a few hours until nitrogen was completely evolved. After evaporation of the solvent, the crude residue of isocyanate was distilled under reduced pressure (B.P. 95–98° C./6 mm. Hg).

(f) A solution of crude 1(d) prepared as indicated was slowly introduced into boiling diphenyl ether contained in a distillation apparatus. The addition was made at such a rate that the low boiling solvent was continuously eliminated. The temperature of the mixture was maintained at 220–240° C. during the introduction of the azide and for one hour after. The mixture was then concentrated in vacuo and diethyl ether was added to complete the precipitation of 1(f). The crude product was filtered, washed with diethyl ether, and crystallized from water (M.P. 213–214° C.). Yield: 65% from 1(b).

Analysis.—Calculated (percent): C, 55.60; H, 3.31; N, 9.26. Found (percent): C, 55.63; H, 3.70; N, 9.24.

EXAMPLE 2

4,5-dihydro-7-chloro-4-oxo-thieno[3,2-c]pyridine

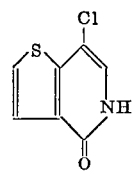

This compound was prepared by chlorination of 1(f), as follows: 8 ml. of aqueous $H_2O_2$ (35%) were slowly added to a solution heated to 65° C. which contained 12 g. of thienopyridone 1(f), 100 cc. of acetic acid, and 8 cc. of concentrated hydrochloric acid. The mixture was then heated to boiling for 10 minutes. The chloroethienopyridone precipitated on cooling. The crude product was filtered and crystallized from ethanol. M.P. 262–264° C. Yield: 10.9 g. (75%).

Analysis.—Calculated (percent): C, 45.25; H, 2.16; N, 7.55. Found (percent): C, 45.49; H, 2.46; N, 7.82.

EXAMPLE 3

4,5-dihydro-7-bromo-4-oxo-thieno[3,2-c]pyridine

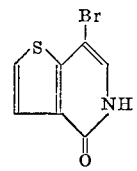

This compound was prepared by bromination of 1(f) as described for Example 2 by replacing HCl with HBr. The same compound is also obtained by using bromine instead of forming this reagent from $HBr+H_2O_2$. M.P. 262–267° C. (crystallized from ethanol) Yield: 74%.

Analysis.—Calculated (percent): C, 36.55; H, 1.74; N, 6.09. Found (percent): C, 36.41; H, 1.80; N, 5.94.

EXAMPLE 4

4,5-dihydro-6-butyl-4-oxo-thieno[2,2-c]pyridine—4(f)

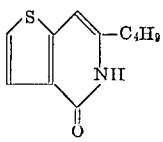

(b) α-Butyl-β-(2-thiophene)acrylic acid

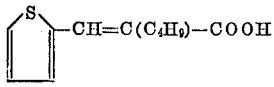

56 g. (0.5 mole) of 2-thenaldehyde were mixed with 114 g. (1 mole) of heptanone, and 10 g. of HCl gas was passed into the cooled mixture which is then shaken for 20 hours. The water formed is removed and the oil is distilled under diminished pressure. B.P. 174° C./20 mm. Hg. Yield: 77%.

*Analysis.*—Calculated (percent): C, 69.2; H, 7.69; O, 7.69. Found (percent): C, 69.3; H, 7.46; O, 7.85.

To 21 g. (0.1 mole) of the preceding ketone dissolved in 200 cc. of alcohol and chilled in a freezing mixture is added with stirring a solution of 40 g. NaOH in 100 cc. of water into which 21.5 g. of chlorine was passed in the cold. The temperature was kept below 20° C., the addition requiring about 15 minutes. The mixture was then stirred for an hour at room temperature. The mixture was distilled until 250 cc. of distillate was collected. On cooling, the residue partly solidified and was filtered. The crude sodium salt of the expected acid was dissolved in boiling water and the solution was acidified with hydrochloric acid. The acid 4(b) separated and was recrystallized from hexane. M.P. 90–92° C. Yield: 43%.

*Analysis.*—Calculated (percent): C, 62.90; H, 6.67. Found (percent): C, 62.87; H, 6.63.

(d) α- Butyl-β-(2-thiophene)acrylyl azide.—Prepared from 4(b) as described for producing 1(d) from 1(b).

(f) The azide 4(d) dissolved in methylene chloride was transformed into the thienopyridone 4(f) by the process described for the preparation of 1(f) from 1(d). M.P. 142–144° C. Yield: 28% (crystallized from dioxane-water).

*Analysis.*—Calculated (percent): C, 63.80; H, 6.28; N, 6.77. Found (percent): C, 63.80; H, 6.49; N, 6.26.

EXAMPLE 5

4,5-dihydro-2bromo-4-oxo-thieno[3,2-c]pyridine—5(f)

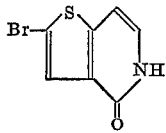

(a) 5 - Bromo - 2 - thenaldehyde.—N. Buu-Hoi and D. Lavit, J. Chem. Soc. 1958, 1721.

(b) β-(5-bromo-2-thiophene)acrylic acid.—Knoevenagel-Doebner process, see R. Adams, Organic Reactions, vol. 15, p. 204.

156 g. (1.5 mole) of malonic acid were added to a solution containing 175 g. (0.92 mole) of aldehyde 5(a), 10 cc. of piperidine, and 500 cc. of pyridine. The mixture was heated on the water bath for 20 hours and evaporated to dryness. The residue was taken up in water, and the mixture was acidified with hydrochloric acid and filtered. The acid was crystallized from ethanol. M.P. 213–215° C. Yield: 73%.

(d) β-(5-bromo - 2 - thiophene)acrylyl azide.—Same preparation as for 1(d) from 1(b).

(f) Same process as for 1(f) from 1(d). M.P. 298° C. Yield: 74% (crystallized from N,N-dimethylformamide).

*Analysis.*—Calculated (percent): C, 35.50; H, 1.24; N, 6.09. Found (percent): C, 35.42; H, 1.79; N, 6.08.

EXAMPLE 6

1,2-dihydro-1-oxo-benzothieno[2,3-c]pyridine—6(f)

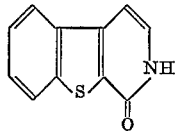

(a) 3-formyl benzothiophene.—E. Campaigne, E. Neiss, J. Heterocyc. Chem. 3, 48 (1966).

(b) β-(3-benzothiophene)acrylic acid.—N. Van Bac, N. Buu-Hoi and N. Dat Xuong, Bull. Soc. Chim. France 1077 (1962).

(c) β-(3-benzothiophene)acrylyl chloride.—A mixture of 10.2 g. (0.05 mole) of the acid 6(b), 8.3 g. of thionyl chloride, and 100 cc. of benzene was shaken one night at room temperature. After evaporation in vacuo, the residue was crystallized from petroleum ether. M.P. 70° C.

(d) β-(benzothiophene)acrylyl azide.—A solution of 6(d) in methylene chloride was obtained from 6(c) as described from the preparation of 1(d) from 1(c).

(e) β - (3-benzothiophene)vinyl isocyanate.—Prepared as described for 1(e). B.P. 130° C./0.1 mm. Hg.

(f) 20.5 g. of 6(e) dissolved in 200 cc. of diphenyl ether were heated with stirring at 240° C. for one hour while nitrogen was bubbled through the solution. After evaporation of the solvent at reduced pressure, the residue was crystallized from butanol. M.P. 265–270° C. Yield: 78%.

*Analysis.*—Calculated (percent): C, 65.70; H, 3.48; N, 6.96. Found (percent): C, 65.30; H, 3.80; N, 7.56.

EXAMPLE 7

4,5-dihydro-4-oxo-furo[3,2-c]pyridine—7(f)

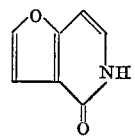

(a) Furaldehyde: commercial product.

(b) β-(2-furane)acrylic acid.—Organic Syntheses, vol. 25, p. 51 (1945).

(c) β-(2-furane)acrylyl chloride.—T. Sazaki., Biochem. L., 25, 2545 (1910).

(d) β-(2-furane)acrylyl azide.—Prepared from 7(c) as described for 1(d) from 1(c).

(e) β-(2-furane)vinyl isocyanate.—Prepared from 7(d) as described for 1(e). B.P. 48° C./0.1 mm. Hg.

(f) The crude product obtained in the preparation of 7(e) before the final distillation step was transformed into 7(f) as described for 6(f). M.P. 202–205° C. (crystallized from toluene). Yield: 30%.

*Analysis.*—Calculated (percent): C, 62.20; H, 3.70; N, 10.35. Found (percent): C, 62.11; H, 3.87; N, 10.58.

EXAMPLE 8

4,5-dihydro-2-methyl-4-oxo-furo[3,2-c]pyridine—8(f)

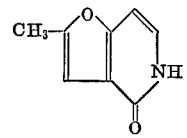

(a) 5-methylfurfuraldehyde.—J. Org. Chem. 22, 1269 (1957).

(b) β-(5-methyl-2-furane)acrylic acid.—D. Taylor, J. Chem. Soc. 1959, 2767.

(d) β-(5-methyl-2-furane)acrylyl azide.—Prepared as described for 1(d) from 1(b).

(e) β-(5-methyl-2-furane)vinyl isocyanate.—Prepared as described for 1(e). B.P. 46° C./0.2 mm. Hg. Yield: 58% from 8(b).

(f) Prepared from 8(d) as described for 1(f). M.P. 206–207° C. (crystallized from water). Yield: 20%.

*Analysis.*—Calculated (percent): C, 64.48; H, 4.70; N, 9.40. Found (percent): C, 64.67; H, 4.68; N, 9.68.

EXAMPLE 9

1,2-dihydro-1-oxo-benzofuro[3,2-c]pyridine—9(f)

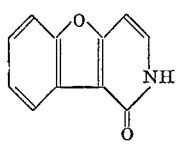

(a) 2-formyl-benzofurane.—Foo Pan and G. Weize, J. Am. Pharm. Assoc. 49, 259 (1960).

(b) β-(2-benzofurane)acrylic acid.—Foo Pan and Tsan-Ching Wang, Chem. Abs. 58, 13881c (1963).

(c) β-(2-benzofurane)acrylyl chloride.—Prepared as described for 6(c).

(d) β-(2-benzofurane)acrylyl azide.—Prepared as described for 1(d) from 1(c).

(e) β(2-benzofurane)vinyl isocyanate.—Prepared as described for 1(e). The crude compound was not distilled. It is a solid melting at 67° C.

(f) Prepared from crude 9(e) as described for 6(f). M.P. 246–248° C. (crystallized from butanol). Yield: 62%.

*Analysis.*—Calculated (percent): C, 71.35; H, 3.78; N, 7.57. Found (percent): C, 71.35; H, 3.89; N, 7.55.

EXAMPLE 10

4,5-dihydro-4-oxo-thieno[2,3-c]pyridine—10(f)

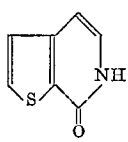

(a) 3-thenaldehyde.—The following improved process was used for the synthesis of 10(a):

In a solution of 13 moles of butyl lithium in 5 liters of petroleum ether cooled at —60° C., one adds 4 liters of dry ether; the mixture is cooled again at —65° C. At this temperature, 1900 g. (11.7 moles) of 3-bromothiophene (Organic Syntheses, vol. 44, p. 9) were added in avout 75 minutes and the mixture was further stirred for 15 minutes. 1021 g. (14 moles) of dimethyl formamide were then introduced in 30 minutes, the temperature being maintained at —45° to —35° C. After the reaction mixture was stirred for half an hour, the temperature was allowed to reach +10° C. The mixture was poured into a mixture of 10 kg. of ice and 10 liters of water acidified to pH 6 by adding 2 liters of concentrated hydrochloric acid and a small amount of acetic acid. The organic layer was separated and washed with 10 liters of water, dried on $Na_2SO_4$ and concentrated. The residue was distilled and the fraction boiling at 81–82° C. under 15 mm. Hg was collected, yielding 730 g. (55%) of 10(a).

The fraction boiling at 126–140° C. (257 g.) gave upon crystallization from ether 100 g. of 2,3-thiophenedialdehyde.

(b) β-(3-thiophene)acrylic acid.—J. Org. Chem. 22, 652 (1957).

(d) β - (3 - thiophene)acrylic azide.—Prepared from 10(b) as described in 1(d) from 1(b).

(f) Prepared from 10(d) as described for 1(f) from 1(d) with the following modification.—the solution of azide obtained from 100 g. of 10(b) (0.65 mole) was introduced in 1000 cc. of boiling diphenyl ether containing 130 g. (0.7 mole) of tributylamine. The pyridone 10(f) was isolated as indicated for 1(f) and crystallized from water. M.P. 190–192° C. Yield: 60% from 10(b).

*Analysis.*—Calculated (percent): C, 55.60; H, 3.31; N, 9.26. Found (percent): C, 55.24; H, 3.83; N, 9.22.

The condensed pyridones of the invention are compounds that can be represented by Formula II:

II

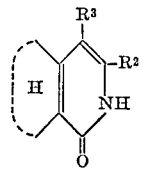

wherein $R^2$ is as defined above with respect to Formula I, wherein $R^3$ represents chloro, bromo, or $R^1$ as defined above with respect to Formula I, and wherein the

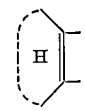

moiety represents a furylene group, a thienylene group, or a benzo derivative thereof, which can be substituted as discussed above with respect to Formula I.

Among the condensed pyridones that are provided by the invention are the following compounds:

4,5-dihydro-4-oxo-furo[3,2-c]pyridine,
2-methyl-4,5-dihydro-4-oxo-furo[3,2-c]pyridine,
2-bromo-4,5-dihydro-4-oxo-furo[3,2-c]pyridine,
2-chloro-4,5-dihydro-4-oxo-furo[3,2-c]pyridine,
2-chloromethyl-4,5-dihydro-4-oxo-furo[3,2-c]pyridine,
2-diethylaminomethyl-4,5-dihydro-4-oxo-furo[3,2-c]pyridine,
2,3-dimethyl-4,5-dihydro-4-oxo-furo[3,2-c]pyridine,
2-ethoxymethyl-4,5-dihydro-4-oxo-furo[3,2-c]pyridine,
2-ethyl-4,5-dihydro-4-oxo-furo[3,2-c]pyridine,
2-methylthio-4,5-dihydro-4-oxo-furo[3,2-c]pyridine,
2-methoxymethyl-4,5-dihydro-4-oxo-furo[3,2-c]pyridine,
2,3-dibromo-4,5-dihydro-4-oxo-furo[3,2-c]pyridine,
2-dimethylamino-4,5-dihydro-4-oxo-furo[3,2-c]pyridine,
2-morpholino-4,5-dihydro-4-oxo-furo[3,2-c]pyridine,
3-bromo-2-methylthio-4,5-dihydro-4-oxo-furo[3,2-c]pyridine,
7-methyl-4,5,dihydro-4-oxo-furo[3,2-c]pyridine,
2,3-dimethyl-7-ethyl-4,5-dihydro-4-oxo-furo[3,2-c]pyridine,
2-methylthio-3-bromo-6-cyano-4,5-dihydro-4-oxo-furo[3,2-c]pyridine,
6-butyl-7-methyl-2,3-dibromo-4,5-dihydro-4-oxo-furo[3,2-c]pyridine,
7-chloro-4,5-dihydro-4-oxo-furo[3,2-c]pyridine,
2-methyl-7-bromo-4,5-dihydro-4-oxo-furo[3,2-c]pyridine,
2,3-dimethyl-7-chloro-4,5-dihydro-4-oxo-furo[3,2-c]pyridine,
and other 4,5-dihydro-4-oxo-furo[3,2-c]pyridines.

The invention also provides compounds such as:

6,7-dihydro-7-oxo-furo[2,3-c]pyridine,
2-ethyl-6,7-dihydro-7-oxo-furo[2,3-c]pyridine,
4-methyl-6,7-dihydro-7-oxo-furo[2,3-c]pyridine,
2-ethyl-4-chloro-6,7-dihydro-7-oxo-furo[2,3-c]pyridine,
2-ethyl-4-bromo-6,7-dihydro-7-oxo-furo[2,3-c]pyridine
and other 6,7-dihydro-7-oxo-furo[2,3-c]pyridine.

There is also provided the following compounds:

7-methyl-3,4-dihydro-3-oxo-furo[3,4-c]pyridine,
2-methyl-7-ethylthio-3,4-dihydro-3-oxo-furo[3,4-c]pyridine,
2-methyl-7-butylthio-3,4-dihydro-3-oxo-furo[3,4-c]pyridine, 2,6,7-trimethyl-3,4-dihydro-3-oxo-furo[3,4-c] pyridine,
7-methyl-6-chloro-3,4-dihydro-3-oxo-furo[3,4-c] pyridine,
and other 7-substituted-3,4-dihydro-3-oxo-furo[3,4-c] pyridines.

In addition, the invention provides:

1,2-dihydro-1-oxo-benzofuro[3,2-c]pyridine,
1,2-dihydro-1-oxo-benzofuro[2,3-c]pyridine,
4-methyl-1,2-dihydro-1-oxo-benzofuro[3,2-c]pyridine,
8-ethyl-4-methyl-1,2-dihydro-1-oxo-benzofuro[3,2-c] pyridine,
6-ethyl-4-methyl-1,2-dihydro-1-oxo-benzofuro[3,2-c] pyridine,
4-chloro-1,2-dihydro-1-oxo-benzofuro[3,2-c]pyridine,
4-bromo-1,2-dihydro-1-oxo-benzofuro[2,3-c]pyridine,
and other 1,2-dihydro-1-oxo-benzofuro[3,2c]- or [2,3-c] pyridines.

Additional compounds provided by the invention include:

4,5-dihydro-4-oxo-thieno[3,2-c]pyridine,
2-bromo-4,5-dihydro-4-oxo-thieno[3,2-c]pyridine,
2-chloro-4,5-dihydro-4-oxo-thieno[3,2-c]pyridine,
2-methyl-4,5-dihydro-4-oxo-thieno[3,2-c]pyridine,
2-methoxy-4,5-dihydro-4-oxo-thieno[3,2-c]pyridine,
2-methylthio-4,5-dihydro-4-oxo-thieno[3,2-c]pyridine,
3-methyl-4,5-dihydro-4-oxo-thieno[3,2-c]pyridine,
2-propenyl-4,5-dihydro-4-oxo-thieno[3,2-c]pyridine,
2-butoxy-4,5-dihydro-4-oxo-thieno[3,2-c]pyridine,
2-isobutylthiomethyl-4,5-dihydro-4-oxo-thieno[3,2-c] pyridine,
2,3-dichloro-4,5-dihydro-4-oxo-thieno[3,2-c]pyridine,
2-methoxymethyl-4,5-dihydro-4-oxo-thieno[3,2-c] pyridine,
3-chloromethyl-4,5-dihydro-4-oxo-thieno[3,2-c] pyridine,
2-chloromethyl-4,5-dihydro-4-oxo-thieno[3,2-c] pyridine,
2-methyl-3-chloromethyl-4,5-dihydro-4-oxo-thieno [3,2-c]pyridine,
2,3-dibromo-4,5-dihydro-4-oxo-thieno[3,2-c]pyridine,
2,3-dimethyl-4,5-dihydro-4-oxo-thieno[3,2-c]pyridine,
2,3-bis(chloromethyl)-4,5-dihydro-4-oxo-thieno[3,2-c] pyridine,
2-piperidinomethyl-4,5-dihydro-4-oxo-thieno[3,2-c] pyridine,
6-cyano-4,5-dihydro-4-oxo-thieno[3,2-c]pyridine,
6-butyl-4,5-dihydro-4-oxo-thieno[3,2-c]pyridine,
7-methyl-4,5-dihydro-4-oxo-thieno[3,2-c]pyridine,
3-bromo-7-methyl-4,5-dihydro-4-oxo-thieno[3,2-c] pyridine,
2-bromo-7-methyl-4,5-dihydro-4-oxo-thieno[3,2-c] pyridine,
2-butyl-7-methyl-4,5-dihydro-4-oxo-thieno[3,2-c] pyridine,
2-chloro-7-methyl-4,5-dihydro-4-oxo-thieno[3,2-c] pyridine,
2-chloro-7-trichloromethyl-4,5-dihydro-4-oxo-thieno [3,2-c]pyridine,
2,3-dibromo-7-methyl-4,5-dihydro-4-oxo-thieno[3,2-c] pyridine,
2-ethyl-7-methyl-4,5-dihydro-4-oxo-thieno[3,2-c] pyridine,
2-ethylthio-7-methyl-4,5-dihydro-4-oxo-thieno[3,2-c] pyridine,
7-methyl-4,5-dihydro-4-oxo-thieno[3,2-c]pyridine,
7-bromo-4,5-dihydro-4-oxo-thieno[3,2-c]pyridine,
7-bromo-2-methyl-4,5-dihydro-4-oxo-thieno[3,2-c] pyridine,
2,7-dibromo-4,5-dihydro-4-oxo-thieno[3,2-c]pyridine,
7-chloro-2-methoxy-4,5-dihydro-4-oxo-thieno[3,2-c] pyridine,
and other 4,5-dihydro-4-oxo-thieno[3,2-c]pyridines.

Additional condensed pyridones include:

6,7-dihydro-7-oxo-thieno[2,3-c]pyridine,
3-bromo-6,7-dihydro-7-oxo-thieno[2,3-c]pyridine,
3-methyl-6,7-dihydro-7-oxo-thieno[2,3-c]pyridine,
3-methylthio-6,7-dihydro-7-oxo-thieno[2,3-c]pyridine,
2-methylthio-6,7-dihydro-7-oxo-thieno[2,3-c]pyridine,
2-methyl-6,7-dihydro-7-oxo-thieno[2,3-c]pyridine,
4-methyl-6,7-dihydro-7-oxo-thieno[2,3-c]pyridine,
4-chloro-2-methyl-6,7-dihydro-7-oxo-thieno[2,3-c] pyridine,
and other 6,7-dihydro-7-oxo-thieno[2,3-c]pyridines.

Still further condensed pyridones that are within the scope of the invention include:

7-bromo-3,4-dihydro-3-oxo-theino[3,4-c]pyridine,
7-methyl-3,4-dihydro-3-oxo-thieno[3,4-c]pyridine,
7-methylthio-3,4-dihydro-3-oxo-thieno[3,4-c]pyridine,
2,7-dichloro-3,4-dihydro-3-oxo-thieno[3,4-c]pyridine,
2,6,7-trimethyl-3,4-dihydro-3-oxo-thieno[3,4-c]pyridine,
7-methylthio-6-chloro-3,4-dihydro-3-oxo-thieno[3,4-c] pyridine,
and other 7-substituted-3,4-dihydro-3-oxo-thieno[3,4-c] pyridines.

Another class of condensed pyridones that are within the scope of the invention include:

1,2-dihydro-1-oxo-benzothieno[2,3-c]pyridine,
1,2-dihydro-1-oxo-benzothieno[3,2-c]pyridine,
8-bromo-1,2-dihydro-1-oxo-benzothieno[3,2-c]pyridine,
9-bromo-6-methyl-1,2-dihydro-1-oxo-benzothieno[3,2-c] pyridine,
7 - bromo-6-methyl-1,2-dihydro-1-oxo-benzothieno[3,2-c] pyridine,
6-methyl-1,2-dihydro-1-oxo-benzothieno[3,2-c]pyridine,
7,8-dimethoxy-1,2-dihydro-1-oxo-benzothieno[3,2-c] pyridine,
7-ethoxy-1,2-dihydro-1-oxo-benzothieno[3,2-c]pyridine,
8-methyl-1,2-dihydro-1-oxo-benzothieno[2,3-c] pyridine,
5-bromo-8-methyl-1,2-dihydro-1-oxo-benzothieno[2,3-c] pyridine,
7-bromo-8-methyl-1,2-dihydro-1-oxo-benzothieno[2,3-c] pyridine,
4-methyl-1,2-dihydro-1-oxo-benzothieno[2,3-c] pyridine,
4-bromo-7,8-dimethoxy-1,2-dihydro-1-oxo-benzothieno [3,2-c]pyridine,
4-chloro-1,2-dihydro-1-oxo-benzothieno[3,2-c] pyridine,
4-chloro-1,2-dihydro-1-oxo-benzothieno[2,3-c] pyridine,
and other 1,2-dihydro-1-oxo-benzothieno[2,3-c]- and [3,2-c]pyridines.

The condensed pyridones of the invention are widely useful as reaction intermediates. For instance, they can be reacted with the acid chlorides of drying oil acids to form N-acyl derivatives which can be used in air-drying surface coating formulations in accordance with known techniques. The furo- and thieno-pyridones which have the 2,3-double bond unsubstituted can be copolymerized with vinyl type monomers to form useful copolymers. For instance, such furo- and thieno-pyridones can be first reacted with the acid chloride of a long chain alkanoic acid such as stearic acid to form the N-acyl derivative, which can then be copolymerized with acrylate monomers such as methyl methacrylate to form copolymers that have utility as viscosity index improvers for lubricating oils.

The invention also provides condensed pyridine derivatives of the condensed pyridones described above. Such derivatives include those that are prepared by reacting phosphorus oxychloride with the pyridone to produce the chloro-pyridine in accordance with the reaction:

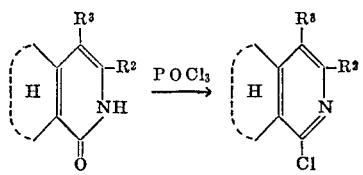

(r)

wherein the several variables are as defined above with respect to Formula II. The reaction of a pyridone with phosphorus oxychloride to produce a chloro-pyridine is a known type of reaction, which is further illustrated by the examples which follow. The invention also provides substitution products of said chloro-pyridines which are prepared by reacting the chloropyridine with a primary or secondary amine to produce an amino derivative, with thiourea to produce a mercapto derivative, with alkali metal alkoxide to produce an alkoxy derivative, the reaction of an alkali metal salt of an cyano compound that has at least one hydrogen attached to the carbon atom alpha to the cyano group to form an alpha-cyano derivative, with methyl iodide to form the N-methyl iodo derivative, the reaction with zinc and acetic acid to substitute a hydrogen atom for the chloro group to form a pyridine, and the like. All of these reactions are known type reactions which are illustrated by the examples which follow.

EXAMPLE 11

(11) 4-chloro-thieno-[3,2-c]pyridine

A mixture of 15.1 g. (0.1 mole) of 1(f) and 25 g. of phosphorus oxychloride was boiled four hours and then evaporated. The residue was treated with ice and extracted with ether. After evaporation of the ethereal solution the remaining chloro derivative was crystallized from hexane. M.P. 96° C. Yield: 70–80%.

*Analysis.*—Calculated (percent): C, 49.60; H, 2.36; N, 8.26. Found (percent): C, 49.26; H, 2.22; N, 8.46.

EXAMPLE 12

(12) 4-hydrazino-thieno[3,2-c]pyridine

A mixture of 17 g. (0.1 mole) of (11) and 50 cc. of hydrazine hydrate was boiled twelve hours. After cooling, the mixture was poured into water and the hydrazino compound was filtered. Yield: 75% M.P. 194–195° C. (crystallized from butanol).

*Analysis.*—Calculated (percent): C, 50.90; H, 4.25; N, 25.45. Found (percent): C, 51.23; H, 4.62; N, 25.26.

EXAMPLE 13

(13) 4-mercapto-thieno[3,2-c]pyridine

A solution containing 3.4 g. (0.02 mole) of (11) and 1.75 g. of thiourea dissolved in 50 cc. of ethanol, was refluxed for eight hours. On cooling, the mercapto derivative precipitated. After filtration it was crystallized from ethanol. M.P. 210–212° C.

*Analysis.*—Calculated (percent): C, 50.30; H, 2.95; N, 8.38. Found (percent): C, 50.34; H, 2.85; N, 8.11.

EXAMPLE 14

(14) 4-methoxy-thieno[3,2-c]pyridine

A solution of 17 g. (0.1 mole) of (11) and 10.8 g. (0.2 mole) of sodium methanolate in 150 cc. of methanol was refluxed for 24 hours and then evaporated. The residue was heated with water and extracted with ether. The ethereal solution was dried and evaporated. The residue consisting of the methoxy derivative distilled under reduced pressure. B.P. 80° C./0.1 mm. Hg.

EXAMPLE 15

(15) 4-β-dimethylaminoethoxy-thieno[3,2-c]pyridine

A solution of 0.2 mole of sodium β-dimethylaminoethanol was prepared by adding 4.8 g. (0.2 mole) of NaH to 75 cc. of β-dimethylaminoethanol. 17 g. (0.1 mole) of (11) were introduced and the mixture was refluxed for 24 hours. After evaporation of the excess of solvent, the residue was taken up in water, extracted with ether, and the ethereal solution was dried on Na$_2$SO$_4$. After evaporation of the ether, the residue distilled under reduced pressure. B.P. 150° C./3 mm. Hg. The picrate melts at 182–185° C.

*Analysis.*—(picarte) Calculated (percent): C, 45.20; H, 3.77; N, 15.50. Found (percent): C, 45.14; H, 3.65; N, 15.54.

EXAMPLE 16

(16) 4-(β-diethylaminoethoxy)thieno[3,2-c]pyridine

Prepared from (11) and β-diethylaminoethanol as indicated for (15). B.P. 150–155° C./1 mm. Hg. Picrate M.P.: 162–164° C.

*Analysis.*—(picrate) Calculated (percent): C, 47.52; H, 4.38; N, 14.60. Found (percent): C, 47.72; H, 4.40; N, 14.72.

EXAMPLE 17

(17) 4-N-morpholino-thieno[3,2-c]pyridine

A mixture of 17 g. (0.1 mole) of (11) and 100 cc. of morpholine was refluxed for 24 hours. After evaporation of the excess of solvent, water was added and the mixture was extracted with benzene. From the residue obtained by evaporation of the organic solution, the expected morpholino derivative was separated by crystallization in light petroleum ether. M.P. 96–98° C.

*Analysis.*—Calculated (percent): C, 60.00; H, 5.46; N, 12.72. Found (percent): C, 59.94; H, 5.82; N, 12.22.

EXAMPLE 18

(18) 4-N-homopiperonylamino-thieno[3,2-c]pyridine

Prepared from (11) and homopiperonylamine as indicated for (17). M.P. 102–105° C. (crystallized from cyclohexane).

*Analysis.*—Calculated (percent): C, 64.5; H, 4.70; N, 9.40. Found (percent): C, 64.36; H, 4.76; N, 9.17.

EXAMPLE 19

(19) 4-N,N'-methylpiperazino-thieno[3,2-c]pyridine

Prepared from (11) and N-methylpiperazine as indicated for (17).

The compound was isolated as its tri-hydrochloride as follows: After evaporating the benzene solution, the residue is dissolved in ethanol and HCl gas is introduced into the solution. The insoluble salt was filtered and crystallized in isopropanol. M.P. (3-HCl) 228° C.

*Analysis.*—Calculated (percent): C, 42.00; H, 5.26; N, 12.28. Found (percent): C, 42.71; H, 5.75; N, 12.40.

EXAMPLE 20

(20) 4-(α-cyanobenzyl)thieno[3,2-c]pyridine 0.72 g. (0.03 mole) of NaH were introduced in 50 cc. of dimethyl sulfoxide maintained at 75° C. After two hours, a solution of 3.51 g. (0.03 mole) of benzyl cyanide was introduced. When the sodium salt was formed, 5.1 g. (0.03 mole) of (11) in 50 cc. of dimethyl sulfoxide was added and the mixture was heated at 100° C. for one hour, then cooled and poured into iced water. The mixture was made acid by addition of diluted hydrochloric acid and extracted with CHCl$_3$. The aqueous acidic solution was made alkaline and extracted with ethyl acetate. The organic solution was dried and evaporated. The residue consisting of the expected product was crystallized from diluted ethanol. M.P. 102–103° C.

*Analysis.*—Calculated (percent): C, 72.10; H, 4.00; N, 11.20. Found (percent): C, 71.62; H, 4.02; N, 11.27.

EXAMPLE 21

(21) 4-(α-cyano-3′,4′-dimethoxybenzyl)thieno[3,2-c]pyridine

Prepared as indicated for (20) by replacing benzyl cyanide with veratryl cyanide and by carrying out the reaction at room temperature. M.P. 143–144° C. (crystallized from cyclohexane).

*Analysis.*—Calculated (percent): C, 65.80; H, 4.54; N, 9.04. Found (percent): C, 65.62; H, 4.70; N, 9.12.

EXAMPLE 22

(22) N-methyl-4-iodo-thieno[3,2-c]pyridinum iodide

A mixture of 17 g. (0.1 mole) of (11), 28.4 g. (0.2 mole) of methyl iodide, and 250 cc. of acetonitrile was refluxed for 24 hours under vigorous stirring. A precipitate was formed while the reaction progressed. The solvent was evaporated and the residue boiled a few minutes with 100 cc. of toluene to extract unreacted material. The unsoluble product was filtered and crystallized from a mixture of dioxane and water. M.P. 257–260° C. Yield: 85%.

*Analysis.*—Calculated (percent): C, 23.80; H, 1.73; N, 3.47. Found (percent): C, 24.03; H, 1.90; N, 3.37.

EXAMPLE 23

(23) Thieno[3,2-c]pyridine

A mixture of 55 g. of (11), 200 g. of zinc, and 1000 cc. of glacial acetic acid was refluxed for 12 hours, and then evaporated to dryness. The residue was taken up in water and hydrochloric acid was added to make the solution acid. The mixture was extracted with chloroform and the acidic aqueous solution was made alkaline with NaOH and extracted with chloroform. The organic solution was dried and the solvent was evaporated. The viscous residue was distilled under reduced pressure; thienopyridine distilled at 125° C. uner 20 mm. Hg and solidified on cooling. (M.P. 45° C.) Yield: 67%.

*Analysis.*—Calculated (percent): C, 62.20; H, 3.70; N, 10.35. Found (percent): C, 61.86; H, 3.82; N, 10.72.

EXAMPLE 24

(24) N-methyl-thieno[3,2-c]pyridinium iodide

A mixture of 3 g. of (23), 18 cc. of methyl iodide, and 100 cc. of acetonitrile was refluxed 4 hours. The insoluble salt of (24) which was formed during the reaction was filtered, washed with acetone and dried. The yield was about quantitative. M.P. 157–158° C.

*Analysis.*—Calculated (percent): C, 34.65; H, 2.89; N, 5.05. Found (percent): C, 34.62; H, 3.01; N, 4.76.

EXAMPLE 25

(25) N-heptyl-thieno[3,2-c]pyridinium iodide

A mixture of 4.5 g. of (23), 27.6 g. of heptyl iodide and 50 cc. of acetonitrile was refluxed for 12 hours. The solvent was evaporated and the residue was treated with petroleum ether which dissolved the excess of starting materials. The crude solid was filtered and crystallized from dioxane.

EXAMPLE 26

(26) N-formyl-4,5,6,7-tetrahydrothieno[3,2-c]pyridine

A solution of 15 g. (23) and 35 cc. of triethylamine in 50 cc. of formic acid was boiled for 24 hours. The excess of formic acid was removed by evaporation in vacuo and the residue was treated with diluted NaOH and extracted with methylene chloride. The organic solution was evaporated under reduced pressure and the residue of N-formyl-tetrahydrothienopyridine distilled at 140–150° C. under 1 mm. Hg.

EXAMPLE 27

(27) 4,5,6,7-tetrahydrothieno[3,2-c]pyridine

A solution of 17.1 g. (0.1 mole) of (26) in 100 cc. of ethanol containing 5.6 g. (0.1 mole) of KOH was refluxed 2 hours. The solvent was evaporated, water was added and the mixture was extracted with chloroform. The organic solution was dried and distilled under reduced pressure.

The hydrochloride was prepared by treating a solution of (27) in ethanol with gaseous HCl. M.P. 220° C. (crystallized from butanol).

*Analysis.*—(hydrochloride) Calculated (percent): C, 47.70; H, 5.70; N, 7.98. Found (percent): C, 47.37; H, 5.57; N, 7.87.

EXAMPLE 28

(28) N-methyl-4,5,6,7-tetrahydrothieno[3,2-c]pyridine 10 g. of NaBH$_4$ were added portionwise to a mixture of 5 g. of (12), 100 cc. of ethanol and 10 cc. of water. After refluxing 5 hours the reaction mixture was poured out in water, made acid with diluted hydrochloric acid and then neutralized with diluted NaOH and extracted with benzene. After evaporation of benzene, the oily residue distilled at 52–54° C. under 0.1 mm. Hg. Yield: 57%. The picrate of (28) was prepared for analysis. M.P. 144–145° C.

*Analysis.*—(picrate) Calculated (percent): C, 44.00; H, 3.66; N, 14.65. Found (percent): C, 43.91; H, 3.61; N, 14.80.

EXAMPLE 29

(29) N-heptyl-4,5,6,7-tetrahydrothieno[3,2-c]pyridine

Prepared by reduction of (25) with NaBH$_4$ by the same process described for the preparation of (28). B.P. 118° C./0.5 mm. Hg.

*Analysis.*—Calculated (percent): C, 71.00; H, 9.70; N, 5.90. Found (percent): C, 70.41; H, 9.97; N, 5.46.

EXAMPLE 30

(30) 4,5-dihydro-5-benzoyl-4-cyano-thieno[3,2-c]pyridine 11.2 g. (0.08 mole) of benzoyl chloride were introduced dropwise in a well-stirred mixture of 5.4 g. (0.04 mole) of (23), 60 cc. of CH$_2$Cl$_2$, 8 g. of KCN (0.12 mole) and 24 cc. of water. After stirring the reaction mixture for 6 hours, the organic layer was separated, washed with diluted HCl, NaOH and then water. After drying the solution, the solvent was evaporated and the residue of crude (30) was crystallized from ethanol. M.P. 136–137° C.

*Analysis.*—Calculated (percent): C, 67.70; H, 3.76; N, 10.53. Found (percent): C, 67.38; H, 3.87; N, 10.64.

EXAMPLE 31

(31) 4,7-dichloro-thieno[3,2-c]pyridine

Obtained from Example 2 as described for the preparation of (11) from 1(f). M.P. 122–124° C. (crystallized from cyclohexane).

EXAMPLE 32

(32) 7-chloro-4-ethoxy-thieno[3,2-c]pyridine

Prepared from (31) and sodium ethanolate as described for the preparation of (14). B.P. 126° C./1 mm. Hg. M.P. 49–51° C.

*Analysis.*—Calculated (percent): C, 50.50; H, 3.80; N, 6.55. Found (percent): C, 50.20; H, 3.87; N, 6.38.

EXAMPLE 33

(33) 7-chloro-4-N-morpholino-thieno[3,2-c]pyridine

Obtained from (31) and morpholine as described for the preparation of (17). B.P. 170° C./1 mm. Hg. M.P. 124°–125° C.

*Analysis.*—Calculated (percent): C, 51.75; H, 4.30; N, 10.98. Found (percent): C, 51.37; H, 4.50; N, 10.76.

EXAMPLE 34

(34) 7-chloro-4-β-diethylaminoethoxy-thieno[3,2-c]pyridine

Obtained from (31) and β-diethylaminoethanol as described for the preparation of (16). B.P. 162–166° C./0.5 mm. Hg.

*Analysis.*—(hydrochloride) Calculated (percent): C, 54.80; H, 5.96; N, 9.84. Found (percent): C, 55.90; H, 6.25; N, 9.34.

EXAMPLE 35

(35) 7-chloro-4-hydrazino-thieno[3,2-c]pyridine

Obtained from (31) and hydrazine hydrate as described for the preparation of (12). M.P. 225–227° C. (crystallized from methanol).

EXAMPLE 36

(36) 7-bromo-4-chloro-thieno[3,2-c]pyridine

Obtained from Example 3 as described for the preparation of (11). M.P. 110–112° C. (crystallized from cyclohexane).

EXAMPLE 37

(37) 7-bromo-4-(β-diethylaminoethoxy)thieno[3,2-c]pyridine

Obtained from (36) and β-diethylaminoethanol as described for the preparation of (16). B.P. 170–174° C./0.5 mm. Hg.

*Analysis.*—Calculated (percent): C, 47.50; H, 5.18; N, 8.50. Found (percent): C, 48.30; H, 5.41; N, 8.19.

EXAMPLE 38

(38) 7-bromo-4-N-morpholino-thieno[3,2-c]pyridine

Obtained from (36) and morpholine as described for the preparation of (17). Isolated by sublimation of the crude material, M.P. 139–141° C. (crystallized from cyclohexane).

*Analysis.*—Calculated (percent): C, 44.05; H, 3.68; N, 9.35. Found (percent): C, 43.84; H, 3.85; N, 8.99.

EXAMPLE 39

(39) 7-bromo-4-hydrazino-thieno[3,2-c]pyridine

Obtained from (36) and hydrazine hydrate as described for the preparation of (12). M.P. 208–210° C. (crystallized from toluene).

EXAMPLE 40

(40) 6-butyl-4-chloro-thieno[3,2-c]pyridine

Obtained from 4(f) as described for the preparation of (11). B.P. 184° C./22 mm. Hg.

*Analysis.*—Calculated (percent): C, 58.50; H, 5.32; N, 6.21. Found (percent): C, 58.74; H, 5.60; N, 6.41.

EXAMPLE 41

(41) 6-butyl-4-hydrazino-thieno[3,2-c]pyridine

Obtained from (40) and hydrazine hydrate as described for the preparation of (12). M.P. 99–101° C. (crystallized from light petroleum ether).

*Analysis.*—Calculated (percent): C, 59.70; H, 6.79; N, 19.00. Found (percent): C, 59.61; H, 6.87; N, 18.85.

EXAMPLE 42

(42) 3-bromo-4-chloro-thieno[3,2-c]pyridine 5.1 g. (0.3 mole) of (11) were introduced in 250 cc. of $CCl_4$ containing 12.5 g. (0.09 mole) of $AlCl_3$. 5.3 g. of bromine were then added and the mixture was kept at room temperature for 12 hours.

After treatment with ice, the organic layer was separated and evaporated. From the crude residue consisting of a mixture of (32) and (33) the components were separated by gas chromatography. M.P. 139–140° C. (crystallized from light petroleum ether).

*Analysis.*—Calculated (percent): C, 33.80; H, 1.20; N, 5.63; Found (percent): C, 33.80; H, 1.84; N, 5.28.

EXAMPLE 43

(43) 2,3-dibromo-4-chloro-thieno[3,2-c]pyridine

Isolated as a by-product accompanying (42). M.P. 134–135° C. (crystallized from light petroleum ether).

*Analyis.*—Calculated (percent): C, 25.70; H, 0.60; N, 4.28. Found (percent): C, 25.59; H, 0.80; N, 4.40.

EXAMPLE 44

(44) 2-bromo-4-chloro-thieno[3,2-c]pyridine

Obtained from 5(f) as described for the preparation of (11).

EXAMPLE 45

(45) 2-bromo-4-hydrazino-thieno[3,2-c]pyridine

Obtained from (44) and hydrazine hydrate as described for the preparation of (12).

EXAMPLE 46

(46) 1-chloro-benzothieno[2,3-c]pyridine

Prepared from 6(f) as reported for (11). M.P. 167° C. (crystallized from cyclohexane).

*Analysis.*—Calculated (percent): C, 60.10; H, 2.74; N, 6.37. Found (percent): C, 60.15; H, 2.90; N, 6.34.

EXAMPLE 47

(47) 1-hydrazino-benzothieno[2,3-c]pyridine

Prepared from 46 and hydrazine hydrate as reported for (12). M.P. 150° C. (dec.) (crystallized from acetonitrile).

*Analysis.*—Calculated (percent): C, 61.40; H, 4.18; N, 19.50. Found (percent): C, 61.16; H, 4.19; N, 18.29.

EXAMPLE 48

(48) 1-mercapto-benzothieno[2,3-c]pyridine

A mixture of 4.5 g. of 7(f), 5 g. of $P_2S_5$, and 50 cc. of pyridine was refluxed 2 hours. After cooling the mixture was poured out on ice and extracted with methylene chloride. The residue isolated after evaporation of the organic solution was crystallized in toluene. M.P. 189–191° C.

*Analysis.*—Calculated (percent): C, 55.30; H, 3.31; N, 9.27. Found (percent): C, 55.56; H, 3.56; N, 9.32.

EXAMPLE 49

(49) 1-chloro-benzofuro[3,2-c]pyridine

Prepared from 9(f) as reported for (11). M.P. 71–72° C. (crystallized from light petroleum ether).

*Analysis.*—Calculated (percent): C, 64.90; H, 2.95; N, 6.89. Found (percent): C, 64.83; H, 2.91; N, 7.18.

EXAMPLE 50

(50) 1-hydrazino-benzofuro[3,2-c]pyridine

Prepared from (49) and hydrazine hydrate as reported for (12). M.P. 160° C. (dec.) (crystallized from butanol).

The preceding Examples 11–50 have illustrated the preparation of several classes of novel compounds. Such classes of compounds include the following:

Chloropyridines of the formula:

III

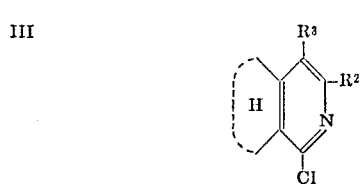

wherein the several variables are as defined above with respect to Formula II.

Substituted pyridines of the formula:

IV

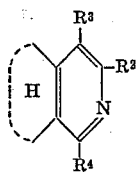

wherein R², R³, and

are as defined above with respect to Formula II, and wherein R⁴ represents hydrazino, mercapto, alkoxy, hydrogen, dialkylaminoalkoxy, N-heterocyclyl, alpha-cyanoalkyl and alpha-cyano-aralkyl, and the like.

The invention also provides N-alkyl-pyridinium iodies whose preparation is illustrated by Examples 22 and 24–25, N-formyl-tetrahydro-pyridines whose preparation is illustrated by Example 26, tetrahydro-pyridines whose preparation is illustrated by Examples 27–28, and many other types of substituted pyridines whose preparations are illustrated by the examples above.

The substituted-pyridines that are provided by the invention have wide utility. For instance, those pyridines that are free of active hydrogen can be used as catalysts for accelerating the reaction of organic polyisocyanates with polyols in the production of urethane polymers of known utility. The utility of the hydrazino-pyridines in the production of further useful derivatives will be illustrated in the discussion below. The mercapto-pyridines can be reacted with drying oil acids to produce compositions useful in air-drying surface coatings formulations. The N-alkyl-tetrahydro-pyridines are useful as catalysts for urethane reactions, as discussed above. The N-unsubstituted-tetrahydro-pyridines can be reacted with drying oil acids, or acid chlorides to produce compositions useful in air-drying surface coating formulations. The N-alkyl-pyridinium iodides are useful as disinfectants. All of the substituted pyridines are useful in research as reaction intermediates.

The hydrazino-pyridines can be reacted in accordance with known types of reactions to form triazolo- and tetrazolo-pyridines. These reactions are illustrated by the following two general reactions:

(s)

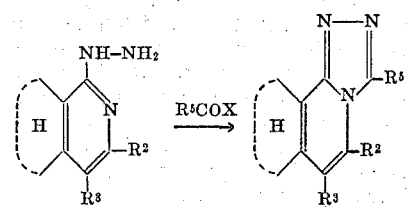

(t)

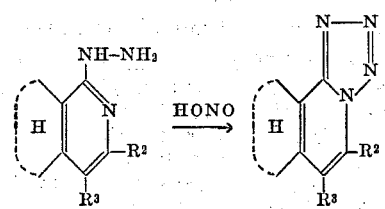

Reactions (s) and (t) are both known types of reactions. In Reaction (s), a hydrazino-pyridine is reacted with an acidic reagent to form a triazolo-pyridine. The acidic reagents that can be used include carboxylic acids, carboxylic acid anhydrides, acid chlorides, esters, ortho formates, and the like. Specific illustrative acidic reagents include the following compounds:

formic acid,
acetic anhydride,
propionic anhydride,
trifluoroacetic acid,
butyric anhydride,
hexanoic anhydride,
cyclohexanoic carbonyl chloride,
octanoic anhydride,
benzoyl chloride,
2,4-dichlorobenzoyl chloride,
phenyl-propiolic acid chloride,
trichloroacetic acid,
maleic anhydride,
diethyl malonate,
hippuric acid,
benzoyl alanine,
beta-chloropropionyl chloride,
triethyl ortho formate,
diethyl oxalate,
2-chloroacetic acid,
2-(N-pyrrolidino)acetic acid,
2-(N-piperidino)acetic acid,
chlorodifluoroacetic acid,
phenylacrylic acid,
acrylic acid,
3-(N-morpholino)propionyl chloride,
3,4-dimethoxyphenylacetyl chloride,
3,4-dimethoxybenzoyl chloride, and the like.

The nature of the triazolo-pyridines that are provided by the invention is illustrated by the reactions set forth below:

(u) The reaction of a 4-hydrazino-thieno[3,2-c]pyridine with an acidic reactant (formic acid) to produce a 6-thia-1,2,3a-triaza(as)indacene:

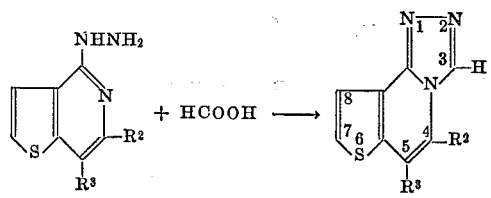

(v) The reaction of a 7-hydrazino-thieno[2,3-c]pyridine with the acidic reactant trifluoroacetic acid to form a 3-trifluoromehyl-8-thia-1,2,3a-triaza(as)indacene:

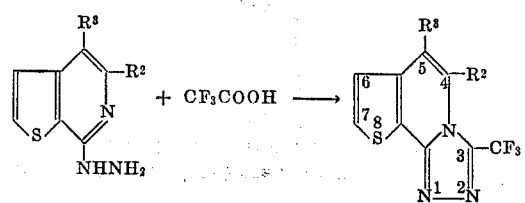

(w) The reaction of a 3-hydrazino-thieno[3,4-c]pyridine with the acidic reactant benzoyl chloride to produce a 3-phenyl-7-thia-1,2,3a-triaza(as)indacene:

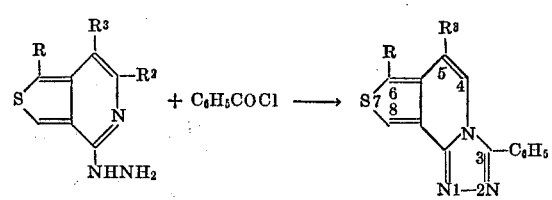

(x) The reaction of a 3-hydrazino-furo[3,4-c]pyridine with the acidic reactant beta-chloropropionyl chloride to produce a 3-(2-chloroethyl) - 7 - oxa-1,2,3a-triaza(as)indacene:

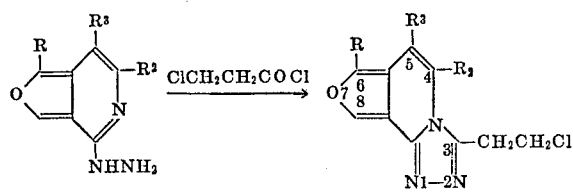

(y) The reaction of a 1-hydrazino-benzofuro[2,3-c]pyridine with the acidic reactant acetic anhydride to form a 3-methyl-10-oxa-1,2,3a-triazacyclopenta[a]fluorene:

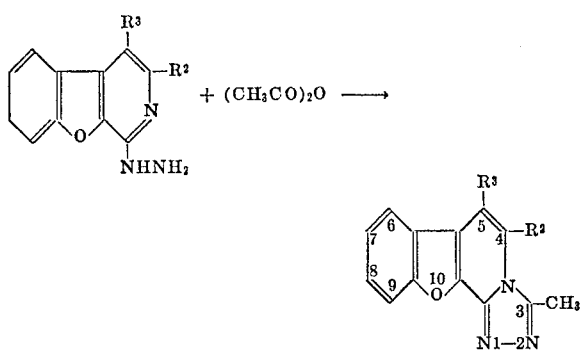

(z) The reaction of a 1-hydrazino-benzofuro[3,2-c]pyridine with the acidic reactant cinnamic acid to form a 3 - (phenethenyl)-6-oxo-1,2,3a-triazacyclopenta[c]fluorene:

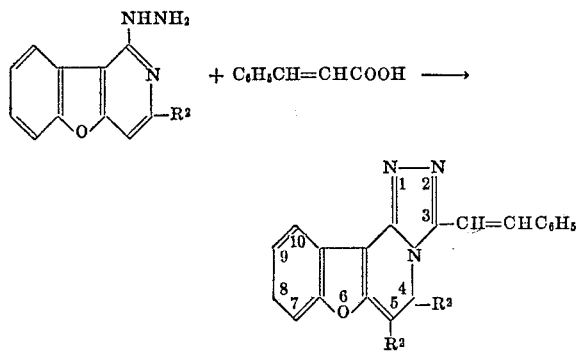

(aa) The reaction of a 1-hydrazino-benzothieno[2,3-c]pyridine with the acidic reactant butyryl chloride to form a 3-propyl-10-thia-1,2,3a-triazacyclopenta[a]fluorene:

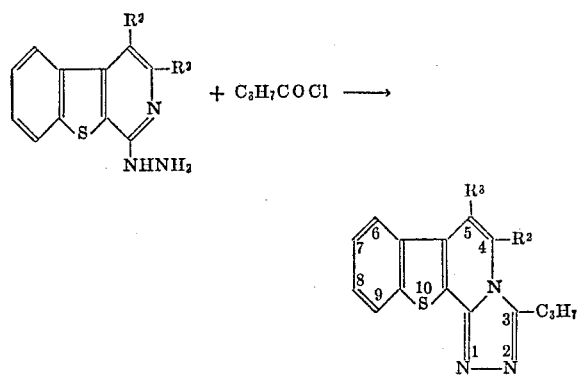

(bb) The reaction of a 1-hydrazino-benzothieno[3,2-c]pyridine with the acidic reactant propionyl chloride to form a 3-ethyl-6-thia-1,2,3a-triazacyclopenta[c]fluorene:

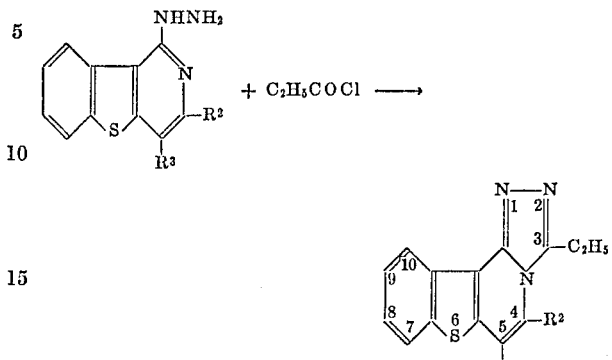

In the foregoing equations (s) through (bb), the variables $R^2$, $R^3$, and the

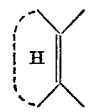

moiety are as defined above with respect to Formula II. In Reaction (s), the $R^5$ variable represents hydrogen, alkyl, haloalkyl, cycloalkyl, aryl, haloaryl, phenylacetylenyl, phenylethenyl, ethenyl, N-morpholino-alkyl, N-pyrrolodino-alkyl, N-piperidino-alkyl, alkoxyaryl, alkoxyaralkyl, and the like, as illustrated by the discussion above.

The reaction of the hydrazino-pyridine with acidic reactant is a known type of reaction, although it has never before been applied to the subject hydrazino-pyridines. The examples below illustrate this reaction:

EXAMPLE 51

(51) 6-thia-1,2,3a-triaza(as)indacene

A solution of 16.5 g. (0.1 mole) of (12) and 150 g. of ethyl orthoformate in 250 cc. of butanol was refluxed 4 hours and then evaporated to dryness. The residue consisting of crude (51) was crystallized from toluene. M.P. 127–128° C.

*Analysis.*—Calculated (percent): C, 54.80; H, 2.86; N, 24.00. Found (percent): C, 54.86; H, 3.25; N, 24.17.

EXAMPLE 52

(52) 3-methyl-6-thia-1,2,3a-triaza(as)indacene 16.5 g. (0.1 mole) of (12) and 100 g. of acetic anhydride were dissolved in 200 cc. of toluene. The mixture was refluxed 14 hours and evaporated to dryness.

The residue was dissolved in chloroform and the solution washed with diluted sodium carbonate and water. After evaporation of the solvent, the residue of crude (52) was crystallized from acetonitrile. M.P. 204° C.

*Analysis.*—Calculated (percent): C, 57.11; H, 3.70; N, 22.20. Found (percent): C, 56.97; H, 3.74; N, 22.49.

EXAMPLE 53

(53) 3-trifluoromethyl-6-thia-1,2,3a-triaza(as)indacene

A solution of 8.25 g. (0.05 mole) of (12), 10.5 g. (0.05 mole) of trifluoroacetic anhydride and 250 cc. of acetonitrile was refluxed for 3 hours. The solvent was evaporated to dryness. The residue of crude (53) was crystallized from cyclohexane. M.P. 149–150° C.

*Analysis.*—Calculated (percent): C, 44.50; H, 1.64; N, 17.30. Found (percent): C, 44.31; H, 1.76; N, 17.40.

EXAMPLE 54

(54) 5-chloro-6-thia-1,2,3a-triaza(as)indacene 11 g. (0.05 mole) of (35) were dissolved in a mixture of 20 cc. formic acid and 60 cc. of ethyl orthoformiate. The solution was refluxed 4 hours and worked up as indicated for (51). M.P. 230–233° C. (crystallized from water). Yield: 80%.

*Analysis.*—Calculated (percent): C, 45.80; H, 1.91; N, 20.10. Found (percent): C, 45.86; H, 1.91; N, 19.72.

EXAMPLE 55

(55) 5-chloro-3-methyl-6-thia-1,2,3a-triaza(as)indacene

A mixture of 11 g. (0.05 mole) of (35) and 100 cc. of acetic anhydride was boiled 4 hours and worked up as indicated for (52).

Crude (55) was dissolved in methanol and transformed into its hydrochloride by bubbling HCl gas through the solution. The hydrochloride was precipitated by addition of ether, filtered, and crystallized from methanol. M.P. 236–238° C.

*Analysis.*—Calculated (percent): C, 41.50; H, 2.69; N, 10.15. Found (percent): C, 41.22; H, 2.67; N, 15.84.

EXAMPLE 56

(56) 5-bromo-6-thia-1,2,3a-triaza(as)indacene

Prepared from (39) by the process described for the preparation of (54). M.P. 230–232° C. (crystallized from water). Yield: 75%.

*Analysis.*—Calculated (percent): C, 37.80; H, 1.57; N, 16.53. Found (percent): C, 37.40; H, 1.57; N, 16.13.

EXAMPLE 57

(57) 5-bromo-3-trifluoromethyl-6-thia-1,2,3a-triaza(as)indacene

Prepared from (29) by the process described for the preparation of (53). M.P. 139–140° C. (crystallized from cyclohexane). Yield: 70%.

*Analysis.*—Calculated (percent): C, 33.48; H, 0.93; N, 13.05; S, 9.94. Found (percent): C, 31.80; H, 1.44; N, 13.07; S, 9.79.

EXAMPLE 58

(58) 10-thia-1,2,3a-triazacyclopenta[a]fluorene

A solution of (47) in 150 g. ethyl forthoformiate was boiled 30 minutes, the precipitate of (56) which was formed progessively was filtered and crystallized from butanol. M.P. 286–291° C.

*Analysis.*—Calculated (percent): C, 64.00; H, 3.11; N, 18.65. Found (percent): C, 63.52; H, 3.24; N, 17.98.

EXAMPLE 59

(59) 3-methyl-10-thia-1,2,3a-triazacyclopenta[a]fluorene

A mixture of 4.3 g. (0.02 mole) of (47), 2 g. (0.02 mole) of acetic anhydride, and 100 cc. of acetonitrile was refluxed 3 hours and evaporated to dryness. The residue was dissolved in xylene and boiled for 4 hours. (59) precipitated on cooling. After filtration it was crystallized from toluene. M.P. 273–274° C.

*Analysis.*—Calculated (percent): C, 65.22; H, 3.76; N, 17.56. Found (percent): C, 64.91; H, 3.76; N, 17.61.

EXAMPLE 60

(60) 3-trifluoromethyl-10-thia-1,2,3a-triazacyclopenta[a]fluorene

Prepared from (47) and trifluoroacetic anhydride by following the process described for (59). M.P. 177–178° C. (crystallized from butanol).

*Analysis.*—Calculated (percent): C, 53.20; H, 2.05; N, 14.33. Found (percent): C, 53.30; H, 2.21; N, 14.31.

EXAMPLE 61

(61) 6-oxa-1,2,3a-triazacyclopenta[c]fluorene

Prepared from (50) and ethylorthoformate as indicated for (51). M.P. 247–252° C. (crystallized from butanol).

*Analysis.*—Calculated (percent): C, 68.90; H, 3.35; N, 20.10. Found (percent): C, 68.56; H, 3.31; N, 20.22.

EXAMPLE 62

(62 3-methyl-6-oxa-1,2,3a-triazacyclopenta[c]fluorene

Prepared from (50) and acetic anhydride as indicated for (52). M.P. 269–270° C. (crystallized from acetonitrile).

*Analysis.*—Calculated (percent): C, 70.00; H, 4.04; N, 18.85. Found (percent): C, 69.77; H, 4.03; N, 18.95.

EXAMPLE 63

(63) 3-trifluoromethyl-6-oxa-1,2,3a-triazacyclopenta[c]fluorene

A mixture of 5.55 g. (0.03 mole) of (50), 8 cc. of trifluoroacetic anhydride and 100 cc. of toluene was boiled for 10 hours. After cooling the precipitate of crude (63) was filtered, washed with water and crystallized from acetonitrile. M.P. 282–283° C.

*Analysis.*—Calculated (percent): C, 56.30; H, 2.16; N, 15.15. Found (percent): C, 56.24; H, 2.40; N, 15.23.

The foregoing Examples 51–63 illustrate the reaction of the hydrazino-pyridines of the invention with an acidic reactant to produce a triazolo-pyridine. As a general rule, this reaction is carried out simply by heating the hydrazinopyridine and the acidic reactant in a convenient solvent for a period of time sufficient to produce the triazolo-pyridine. Preferably, a solvent is employed for the reaction, although in some cases the reaction can be carried out without the use of a solvent. In many cases, a convenient way to control the reaction temperature is to employ a solvent that boils at about the desired reaction temperature, and the reaction can then be carried out by refluxing a mixture of the reactants in the solvent. Suitable solvents include alcohols, halogenated hydrocarbons, heterocyclic compounds, and other compounds that will not react with the reactants. Examples of suitable solvents include butanol, pyridine, tetrahydrofurane, methylene dichloride, chloroform, carbon tetrachloride, dibutyl ether, and the like. In general, the reaction is usually carried out at an elevated temperature within the range of from about 60° to about 200° C. The reaction time will depend upon such factors as nature of the reactants, temperature, and the like, but will normally take from about 15 minutes to about 20 hours, and more usually from about 30 minutes to about 15 hours. The triazolo-pyridine product can be recovered by conventional recovery techniques such as by removing solvent and unreacted acidic reactant by any convenient means such as by evaporation, and then purifying the triazol-pyridine by recrystallization from a convenient solvent. Recrystallization solvents are illustrated in the foregoing Examples 51–63. The reactants are normally used in about stoichiometric proportions, or with a slight excess of the acidic reactant to ensure that as high a proportion as possible of the hydrazino-pyridine (usually the more expensive reactant) will be converted.

The triazolo-pyridines provided by the invention are widely useful materials. They can be used as corrosion inhibitors for aqueous ethylene glycol automobile radiator cooling liquids. The mode of such use will be familiar to those skilled in the art since the triazolo-pyridines have a structural similarity to benzo-triazoles which are presently used as such corrosion inhibitors. The triazolo-pyridines are also useful as ultraviolet light absorbers for thermoplastic resins such as polyethylene, polypropylene, and the like. Their mode of use as ultraviolet light absorbers is analogous to that of such agents now used in the art in such applications.

As was illustrated by Reaction (t) above, the hydrazino-pyridines of the invention can be reacted with nitrous acid to form tetrazolo-pyridines. In the usual case, the reaction with nitrous acid is carried out by generating the nitrous acid in situ by the interaction of an alkali metal nitrite and an acid such as hydrochloric acid. A suitable way to carry out the reaction is to first dissolve the hydrazino-pyridine in aqueous acid. It may be necessary to warm the mixture slightly to facilitate dissolution of the hydrazino-pyridine. The solution is then cooled in an ice bath to about −15° to about +10° C., and an aqueous solution of alkali metal nitrite is added in about stoichiometric proportions (i.e., about 1 to 1.1 moles of alkali metal nitrite per mole of hydrazino-pyridine). The reaction mixture is then stirred for a period of time, such as from about 15 minutes to about 5 hours, sufficient to produce the tetrazolo-pyridine. The product can be recovered by filtration (the tetrazolo-pyridine is insoluble in water), and purified by recrystallization from a convenient solvent.

The tetrazolo-pyridines of the invention can be used as corrosion inhibitors and as ultraviolet light absorbers in the manner discussed above with respect to the triazolo-pyridines of the invention. The production of the tetrazolo-pyridines is illustrated by the following examples:

EXAMPLE 64

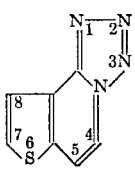

(64) 6-thia-1,2,3,3a-tetrazo(as)indacene 6.6 g. (0.04 mole) of (12) were dissolved in a mixture of 50 cc. of acetic acid and 10 cc. of water. The solution was cooled at 0° C. and 3.5 g. of $KNO_2$ dissolved in a small amount of water were introduced dropwise. The mixture was stirred for 3 hours, water was added, and the precipitate of (64) was filtered and crystallized from benzene. M.P. 170–172° C.

Analysis.—Calculated (percent): C, 47.70; H, 2.27; N, 31.70. Found (percent): C, 48.22; H, 2.48; N, 31.21.

EXAMPLE 65

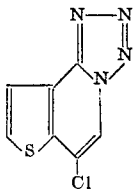

(65) 5-chloro-6-thia-1,2,3,3a-tetraza(as)indacene

Prepared from (35) as indicated for (64). M.P. 180° C. (crystallized from toluene).

Analysis.—Calculated (percent): C, 39.96; H, 1.43; N, 26.55. Found (percent): C, 40.04; H, 1.62; N, 26.01.

EXAMPLE 66

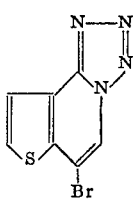

(66) 5-bromo-6-thia-1,2,3,3a-tetraza(as)indacene

Prepared from (39) as indicated for (64). M.P. 222–224° C. (crystallized from toluene).

Analysis.—Calculated (percent): C, 32.95; H, 1.18; N, 21.85. Found (percent): C, 32.80; H, 1.54; N, 21.40.

The following examples further illustrate the preparation of condensed pyridones in a manner similar to that employed in Examples 1–10.

EXAMPLE 67

(67) 4,5-dihydro-1-benzyl-3-carbethoxy-2-methyl-4-oxo-pyrrolo[3,2-c]pyridine—(d)

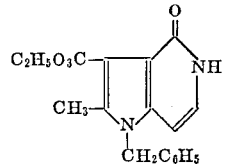

(a) 1-benzyl-4-carbethoxy-5-methylpyrrole-2-carboxaldehyde. H. Shinohara and coll., Chem. Abst. 59 3867d (1963).

(b) β(1-benzyl-4-carbethoxy-5-methyl-2-pyrrole)acrylic acid. (Knoevenagel-Doebner process; see R. Adams, Organic Reactions, vol. 15, p. 204).

156 g. (1.5 mole) of malonic acid were added to a solution containing 271 g. (1.0 mole) of aldehyde I, 10 cc. of piperidine and 500 cc. of pyridine. The mixture was heated on the water bath for 20 hours and evaporated to dryness. The residue was taken up in water, the mixture was acidified with hydrochloric acid and filtered. The acid was crystallized from ethanol. M.P. 206° C. Yield: 70%.

Analysis.—Calculated (percent): C, 69.01; H, 6.07; N, 4.47. Found (percent): C, 68.62; H, 6.13; N, 4.25.

(c) β(1-benzyl-4-carbethoxy-5-methyl - 2 - pyrrole) acrylic azide.—1 mole of triethylamine in 400 cc. of acetone was introduced in a solution of 266 g. 0.85 mole) of (b) (acrylic acid) in 1500 cc. of the same solvent, the mixture being maintained at 0° C. A solution of 1.1 mole of ethyl chloroformate in 400 cc. of acetone was then slowly introduced in the cooled mixture. After 30 min. stirring, 1.3 mole of $NaN_3$ in 300 cc. of water was added dropwise at 0°. The mixture was stirred for an additional hour and poured on 4000 ml. of $H_2O$. The azide was then extracted with methylene chloride or benzene and the solution was dried on $Na_2SO_4$ or $P_2O_5$. This solution was used for the following reaction.

(d) A solution of crude azide (c) prepared as indicated was slowly introduced in boiling diphenyl ether contained in a distillation apparatus at such a rate that the low boiling solvent was continuously eliminated. The temperature of the mixture was maintained at 220–240° C. during the introduction of the azide and one hour after. The mixture was then concentrated in vacuo and ether was added to complete the precipitation of (d). The crude product was filtered, washed with ether and crystallized from water. M.P. 224° C. Yield: 27% from (b).

Analysis.—Calculated (precent): C, 69.68; H, 5.80; N, 9.03. Found (percent): C, 69.72; H, 5.98; N, 8.76.

EXAMPLE 68

(68) 4,5-dihydro-1-benzyl-4-oxopyrrolo[3,2-c]pyridine—(d)

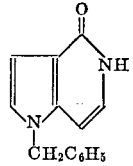

(a) N-benzylpyrrole-2-carboxaldehyde.—153 g. (0.1 mole) of $POCl_3$ were slowly introduced in a well stirred mixture of 15.7 g. (0.1 mole) of N-benzylpyrrole and 7.3 g. of dimethylformamide. After heating one hour on a water bath, the cooled solution was poured out on ice and adjusted to pH 8 by adding a diluted solution of NaOH. The mixture was extracted with ether and the etheral solution was dried and evaporated. The liquid residue was distilled in vacuo. The aldehyde was collected at 168–170° C./14 mm. Hg.

(b) β(1-benzylpyrrole) acrylic acid.—Prepared by treating N-benzylpyrrole-2-carboxaldehyde with malonic acid as indicated for the preparation of (b) in Example 67.

(c) β(1-benzylpyrrole) acrylic azide.—Prepared as indicated for the synthesis of (c) in Example 67.

(d) Prepared from the crude azide (c) above by cyclization of the isocyanate intermediate as indicated for (d) in Example 67. Crystallized from water. M.P. 202° C. Yield: 48% from (b) above.

Analysis.—Calculated (percent): C, 75.00; H, 5.35; N, 12.50. Found (percent): C, 75.22; H, 5.39; N, 12.49.

EXAMPLE 69

4,5-dihydro-1-benzyl-3-carboxy-2-methyl-4-oxo-pyrrolo[3,2-c]pyridine

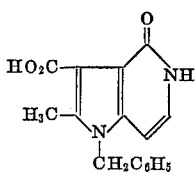

A mixture of 3 g. of 4,5 - dihydro - 1-benzyl-3-carbethoxy - 2 - methyl-4-oxo-pyrrolo[3,2-c]pyridine, 0.5 g. of NaOH and 20 ml. of water was heated on a waterbath until complete dissolution. The acid was then precipitated by addition of diluted HCl and filtered. It was crystallized from a mixture dioxane-water. M.P. 270° C. dec. Yield: 88%.

Analysis.—Calculated (percent): C, 68.08; H, 4.96; N, 9.92. Found (percent): C, 67.98; H, 5.06; N, 9.77.

EXAMPLE 70

4,5-dihydro-1-benzyl-3-(β-hydroxyethyl)carbamyl-2-methyl-4-oxopyrrolo[3,2-c]pyridine

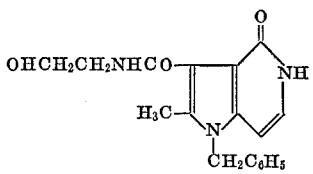

A solution of 3 g. of 4,5 - dihydro - 1 - benzyl-3-carbethoxy - 2 - methyl-4-oxopyrrolo[3,2-c]pyridine, in 15 ml. of β-aminoethanol was boiled for 2 hours. After cooling the mixture was poured out in 150 ml. of water. The amide which precipitated, was filtered and crystallized from a mixture dioxane-water. M.P. 245° C. Yield: 93%.

Analysis.—Calculated (percent): C, 66.46; H, 5.84; N, 12.92. Found (percent): C, 66.33; H, 5.98; N, 12.49.

EXAMPLE 71

4,5-dihydro-5-benzoyl-1-benzyl-4-oxo-pyrrolo-[3,2-c]pyridine

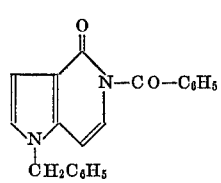

2.25 g. of 4,5 - dihydro-1-benzyl-4-oxo-pyrrolo-[3,2-c]pyridine, dissolved in 20 ml. of pyridine were treated with 1.5 g. of benzoyl chloride. The mixture was heated one hour on the water bath and then poured out in water. After filtration, the benzoyl derivative was crystallized from diluted acetone. M.P. 85° C. Yield: 26%.

Analysis.—Calculated (percent): C, 76.83; H, 4.88; N, 8.53. Found (percent): C, 77.18; H, 5.09; N, 8.25.

EXAMPLE 72

1,2-dihydro-2-azaphenantrene-1-one

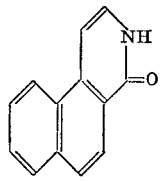

101 g. (1 mole) of triethylamine in 400 cc. of acetone was introduced in a solution of 168 g. (0.85 mole) of β-(1-naphthyl) (acrylic acid) (Rousset, Bull. Soc. Chim. France [3], 17, 813) in 1500 cc. of the same solvent, the mixture being maintained at 0° C. A solution of 120 g. (1.1 mole) of ethyl chloroformate in 400 cc. of acetone was then slowly introduced in the cooled mixture. After 30 min. stirring, 84.5 g. (1.3 mole) of $NaN_3$ in 300 cc. of water was added dropwise at 0°. The mixture was stirred for an additional hour and poured on 4000 ml. of $H_2O$. The azide was then extracted with methylene chloride and the solution was dried on $Na_2SO_4$ or $P_2O_5$. The solution of crude azide was slowly introduced in boiling diphenyl ether contained in a distillation apparatus at such a rate that the low boiling solvent was continuously eliminated. The temperature of the mixture was maintained at 220–240° C. during the introduction of the azide and one hour after. The mixture was then concentrated in vacuo and ether was added to complete the precipitation. The crude product was filtered, washed with ether and crystallized from aqueous dimethylformamide. M.P. 270° C. Yield: 60%.

Analysis.—Calculated (percent): C, 80.00; H, 4.60; N, 7.20. Found (percent): C, 79.80; H, 4.70; N, 6.90.

EXAMPLE 73

3,4-dihydro-3-azaphenantrene-4-one

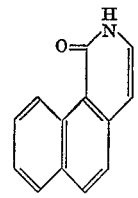

The composition was prepared from β-(2-naphthyl) acrylic acid (Rousset, Bull. Soc. Chim. France [3] 17, 815) as indicated for Example 72. Crystallized from aqueous dimethyl formamide. M.P. 201–202° C. [litt. 200–201° C. C. F. Koelsch and R. M. Lindquish J. Org. Chem. 21, 657 (1956)]. Yield: 60%.

Analysis.—Calculated (percent): C, 80.00; H, 4.60; N, 7.20. Found (percent): C, 79.90; H, 4.40; N, 7.20.

EXAMPLE 74

1,2-dihydro-9-benzyl-1-oxo-pyrid[3,4-b]indole.—(d)

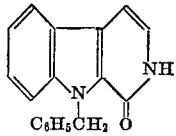

(a) N-benzyl-indole-3 - carboxaldehyde.—A. Kalir and S. Szara. J. Med. Chem. 9, 793 (1966).

(b) β(N-benzyl-3-indole) acrylic acid.—12.4 g. (0.055 mole) of triethyl phosphonoacetate are added to a suspension of 1.25 g. (0.052 mole) of NaH in 200 cc. of ethylene-glycol dimethylether. The mixture was stirred 1 hour while the temperature was maintained below 20° C. A solution containing 11.8 g. (0.05 mole) of (a) above in 200 cc. of ethyleneglycol dimethylether was then introduced and the mixture was refluxed for 4 hours.

After cooling, it was poured out on ice and extracted with ether. The ethereal solution was evaporated and the residue was crystallized from light petroleum ether giving the ethyl ester of (b) above. M.P. 103° C.

A solution of 15 g. of this ethyl ester and 2 g. NaOH in a mixture of 250 cc. of ethanol and 50 cc. of water was boiled for 8 hours. After dilution, the solution was extracted with ether to eliminate unreacted material and then acidified with hydrochloric acid. The mixture was extracted with chloroform and the organic layer was separated and dried. After evaporation of chloroform the residue of crude (b) was crystallized from benzene. M.P. 191° C. Yield: 80%.

*Analysis.*—Calculated (percent): C, 78.00; H, 5.42; N, 5.06. Found (percent): C, 77.68; H, 5.62; N, 5.31.

(c) β(N-benzyl - 3 - indole) acrylyl azide.—Prepared from (b) as described for the synthesis of (c) of Example 67.

(d) The indole was prepared from (c) as described for the synthesis of 4,5-dihydro-1-benzyl-3-carbethoxy-2-methyl-4-oxo-pyrrolo[3,2-c]pyridine. Crystallized from dioxane. M.P. 290° C. Yield: 40% from β(N-benzyl-3-indole) acrylic acid.

*Analysis.*—Calculated (percent): C, 78.90; H, 5.10; N, 10.20. Found (percent): C, 78.55; H, 4.85; N, 10.37.

EXAMPLE 75

1,2,3,4-tetrahydro-9-benzyl-1-oxo-pyrid[3,4-b]indole

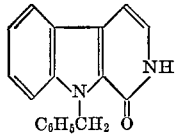

To a mixture of 0.2 g. of LiAlH$_4$ and 50 ml. of tetrahydrofurane, one added a solution of 1 g. of 1,2-dihydro-2-benzyl-1-oxo-pyrid[3,4-b]indole in 50 ml. of tetrahydrofuran. After refluxing 4 hours, the mixture is cooled and the excess of LiAlH$_4$ was decomposed by carefully adding a small amount of water. The mixture was then poured out on ice and treated with diluted NaOH for dissolving Al(OH)$_3$. After extraction with ethyl acetate, the organic solution was dried and evaporated. The solid residue was crystallized from toluene. M.P. 268° C.

*Analysis.*—Calculated (percent): C, 78.25; H, 5.80; N, 10.08. Found (percent): C, 78.25; H, 5.96; N, 10.38.

EXAMPLE 76

Synthesis of 4,5-dihydro-1,3-dimethyl-4-oxo-pyrazolo[4,3-c]pyridine—(e)

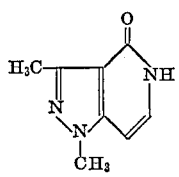

(a) 1,3 - dimethylpyrazole-5-carboxaldehyde diethyl-acetal.—18.8 g. of (0.1 mole) of 1-diethoxy-2,4-pentanedione were added to a solution of 4.6 g. (0.1 mole) of methyl hydrazine in 100 ml. of methanol maintained at 10.° C. The mixture was kept at room temperature for 12 hours and then heated to reflux for one hour. The solvent was evaporated and the residue distilled under reduced pressure. B.P. 78–80° C./0.5 mm. Hg. Yield: 85%.

*Analysis.*—Calculated (percent): C, 60.55; H, 9.09; N, 14.13. Found (percent): C, 60.58; H, 9.15; N, 14.13.

(b) 1,3-dimethyl pyrazole-5-carboxaldehyde.—A mixture of 34 g. of (a) above and 250 ml. of HClN as stirred for one night at room temperature and then neutralized by addition of Na$_2$CO$_3$. The aldehyde was extracted with ether, the ethereal solution evaporated and the residue distilled at 84° under 16 mm. Hg. Yield: 88% [Litt. Chem. Abstr. 20, 2857 (1926)].

(c) β[5-(1,3-dimethyl)pyrazolyl] acrylic acid.—Prepared from the aldehyde, (b) above, and malonic acid as indicated for compound (b) of Example 67. Crystallized from acetonitrile. M.P. 208–209° C. Yield: 78%.

*Analysis.*—Calculated (percent): C, 57.85; H, 6.03; N, 16.95. Found (percent): C, 57.52; H, 6.32; N, 17.16.

(d) β[5-(1,3-dimethyl)pyrazolyl] acrylyl azide.—Prepared from the acrylic acid, (c) above, as indicated for compound (c) of Example 67.

(e) The decomposition of the azide, (d) above, into the corresponding isocyanate and the subsequent cyclization into the condensed pyridone was carried out in boiling diphenylether containing an equivalent amount of tributylamine.

The pyridone was crystallized from nitromethane. M.P. 243–244° C. Yield: 65% from the acrylic acid, (c) above.

*Analysis.*—Calculated (percent): C, 58.90; H, 5.52; N, 25.80. Found (percent): C, 58.83; H, 5.64; N, 25.83.

EXAMPLE 77

Synthesis of 3,4-dihydro-4-oxo-benzothieno[3,2-c]pyridine—(d)

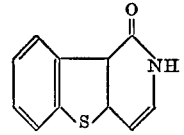

(a) Benzothiophene-2-carboxaldehyde.—(Shirley and Danzig. J. Am. Chem. Soc. 74, 2935 (1952)).

(b) β-(2-benzothiophene) acrylic acid.—Prepared from the aldehyde, (a) above, and malonic acid as indicated for compound (b) of Example 67. Yield: 85% [known compound: W. Reid and W. Reitz. Ber. 89, 2570 (1956)].

(c) β(2-benzothiophene) acrylyl azide.—Prepared as indicated for compound (c) of Example 1.

(d) Prepared from azide, (c) above, as indicated for Example 76.—M.P. 250° C. Yield: 12.5%.

*Analysis.*—Calculated (percent): C, 65.62; H, 3.48. Found (percent): C, 65.90; H, 3.60.

EXAMPLE 78

Synthesis of 3,4-dihydro-4-oxo-benzoselenopheno[3,2-c]pyridine

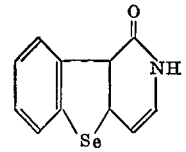

This compound was prepared from benzoselenophene-2-carboxaldehyde as indicated for the synthesis of 3,4-dihydro - 4 - oxo-benzothieno[3,4-c]pyridine (Example 74). From β(2-benzoselenophene) acrylic acid [L. Christiaens and M. Renson, Bull. Soc. Chim. Belges 77, 161 (1968)], the yield was 70.5%. M.P. 252° C.

*Analysis.*—Calculated (percent): C, 53.22; H, 2.08. Found (percent): C, 53.33; H, 2.20.

The following examples further illustrate the preparation of condensed chloro-pyridines by the reaction of pyridones with phosphorus oxychloride as set forth in Example 11.

EXAMPLE 79

4-chloro-1,3-dimethylpyrazole[4,3-c]pyridine

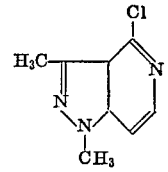

A mixture of 2 g. of 4,5-dihydro-1,3-dimethyl-4-oxo-pyrazolo[4,3-c]pyridine and 25 ml. of POCl₃ was boiled for 12 hours and then evaporated. The residue was treated with ice and extracted with ether. After evaporation of the ethereal solution, the remaining chloro derivative was crystallized from light petroleum ether. M.P. 140° C.

*Analysis.*—Calculated (percent): C, 52.90; H, 4.42; N, 23.10. Found (percent): C, 52.61; H, 4.44; N, 23.17.

EXAMPLE 80

9-benzyl-1-chloro-pyrid[3,4-b]indole

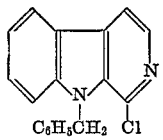

A mixture of 1 g. of 1,2-dihydro-9-benzyl-1-oxopyrid[3,4-b]indole, 25 ml. of POCl₃ and 1 ml. of pyridine was refluxed 24 hours, and after cooling, poured out on iced water. The mixture was made alkaline and extracted with chloroform. The organic layer was separated, dried and evaporated. The residue was crystallized from light petroleum ether. M.P. 136–138° C.

*Analysis.*—Calculated (percent): C, 73.80; H, 4.45; N, 9.50. Found (percent): C, 73.67; H, 4.56; N, 9.34.

The following examples further illustrate the preparation of mercapto derivatives of the pyridones:

EXAMPLE 81

1-benzyl-4-mercapto-pyrrolo[3,2-c]pyridine

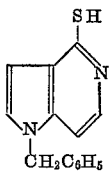

A solution of 1 g. of 4,5-dihydro-1-benzyl-4-oxo-pyrrolo[3,2-c]pyridine and 2.2 g. of P₂S₅ in 50 ml. of pyridine was refluxed 3 hours. The solvent was evaporated in vacuo and the residue was treated with boiling water to dissolve the thio derivative. After filtration, the hot water solution was cooled, and the precipitate which was formed, was filtered and recrystallized from diluted acetic acid. M.P. 264° C. Yield: 41%.

*Analysis.*—Calculated (percent): C, 70.00; H, 5.00; N, 11.66. Found (percent): 69.74; H, 5.30; N, 11.38.

EXAMPLE 82

9-benzyl-1-mercapto-pyrid[3,4-b]indole

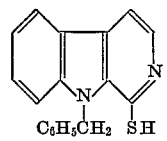

A solution containing 3 g. of 1,2-dihydro-9-benzyl-1-oxo-pyrid[3,4-b]indole and 1 g. of thiourea in 50 ml. of ethanol was refluxed for 8 hours. On cooling the indole precipitated. After filtration, it was crystallized from propanol. M.P. 226–231° C.

*Analysis.*—Calculated (percent): C, 74.50; H, 4.83; N, 9.60. Found (percent): C, 74.23; H, 4.96; N, 9.53.

EXAMPLE 83

1-benzyl-4-methylthio-pyrrolo[3,2-c]pyridine

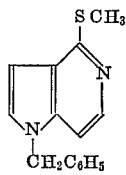

0.7 g. of dimethyl sulfate were added to a boiling solution of 1 g. of 1-benzyl-4-mercapto-pyrrolo[3,2-c]pyridine, 0.5 g. KOH and 25 ml. of methanol. After 30 minutes refluxing, the mixture was evaporated and the residue treated with water to eliminate the unreacted material. The residue was crystallized from hexane. M.P. 66° C. Yield: 4%.

*Analysis.*—Calculated (percent): C, 70.86; H, 5.51; N, 11.02. Found (percent): C, 70.52; H, 5.66; N, 10.73.

EXAMPLE 84

9-benzyl-1-benzylthio-pyrid[3,4-b]indole

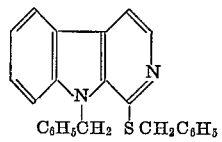

1.5 g. of benzyl chloride were added to a boiling mixture of 3 g. of 9-benzyl-1-mercapto-pyrid[3,4-b]indole, 0.6 g. of KOH and 50 ml. C₂H₅OH. The reflux was maintained 8 hours and the solvent was evaporated. The residue was taken up in water and the mixture was extracted with ether. The organic layer was dried and evaporated to dryness. The residue was crystallized from toluene. M.P. 129° C.

*Analysis.*—Calculated (percent): C, 78.95; H, 5.26; N, 7.36. Found (percent): C, 78.62; H, 5.19; N, 7.09.

The invention is defined in the claims which appear below. In the specification and claims, the symbols

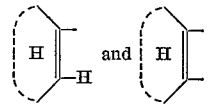

have been used in the formulas for the vinyl isocyanates that are used in the process of the invention and for the products that are derived therefrom. In the case of a compound such as 2-(2-ethylthio-5-methyl-3-furyl)vinyl isocyanate,

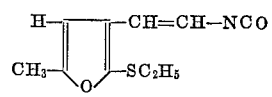

the customary way of signifying the double bonds does not show a double bond between the carbon atoms to which are attached respectively the vinyl isocyanate group and the hydrogen atom which is essential for the ring closure reaction. However, two double bonds in a furyl group and in a thienyl group are conjugated and therefore some resonance is present. For this reason, the two symbols referred to above represent the cases where the ring closure is between the 3 and 4 carbon atoms as well as those cases where the ring closure is between the 2 and 3 carbon atoms.

What is claimed is:

1. The condensed pyridone of the formula

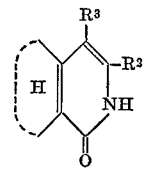

wherein R² represents hydrogen or alkyl of up to six carbon atoms, wherein R³ represents hydrogen or alkyl of up to six carbon atoms, and wherein the

moiety represents the furylene group, wherein said moiety is either unsubstituted or contains one or more substituents selected from the group consisting of halo, alkyl of up to six carbon atoms, chloromethyl, dialkylaminoalkyl wherein the alkyl groups individually have up to four carbon atoms, alkoxy of up to six carbon atoms, alkylthio of up to six carbon atoms, and dialkylamino wherein the alkyl groups individually have up to four carbon atoms.

2. The condensed pyridone of claim 1 which is 4,5-dihydro-4-oxo-furo[3,2-c]pyridine.

3. The condensed pyridone of claim 1 which is 4,5-dihydro-2-methyl-4-oxo-furo[2,3-c]pyridine.

4. Process for the preparation of the condensed pyridone of claim 1 which comprises heating at a temperature of from about 200° C. to about 300° C. a reaction mixture comprising a vinyl isocyanate of the formula:

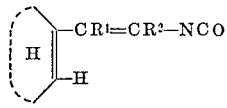

wherein $R^1$ represents hydrogen or alkyl of up to six carbon atoms, wherein $R^2$ represents hydrogen or alkyl of up to six carbon atoms, and wherein the

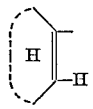

moiety represents the furyl group, wherein said moiety is either unsubstituted or contains one or more substituents selected from the group consisting of halo, alkyl of up to six carbon atoms, chloromethyl, dialkylaminoalkyl wherein the alkyl groups individually have up to four carbon atoms, alkoxy of up to six carbon atoms, alkylthio of up to six carbon atoms, and dialkylamino wherein the alkyl groups individually have up to four carbon atoms.

5. The process of claim 4 wherein said process is carried out at a temperature of from about 220° to about 280° C.

6. The process of claim 4 wherein the vinyl isocyanate is generated in situ by heating the corresponding acid azide.

7. The process of claim 4 wherein said process is carried out in an inert reaction medium that boils at atmospheric pressure at a temperature between about 200° and about 300° C.

8. The process of claim 7 wherein said inert reaction medium is diphenyl ether.

9. The process of claim 4 wherein the reaction mixture contains a tertiary amine whose boiling point at atmospheric pressure is higher than the temperature at which the process is carried out.

10. The process of claim 9 wherein the tertiary amine is tributylamine.

References Cited

Chem. Abstracts, vol. 26, p. 5096, Matejka et al. (1932).

Chem. Abstracts, vol. 50, pp. 15, 527, Ritchie (1956).

Stevens et al., J. Am. Chem. Soc., vol. 64, pp. 1093–5 (1942).

ALAN L. ROTMAN, Primary Examiner

U.S. Cl. X.R.

260—294.8 B, 294.8 C, 296 H, 297 T, 268 BC, 247.1; 252—47.5, 51.5